US012634976B2

(12) United States Patent
Khoshnevisan et al.

(10) Patent No.: US 12,634,976 B2
(45) Date of Patent: May 19, 2026

(54) ACKNOWLEDGMENT FEEDBACK FOR SEMI-PERSISTENT SCHEDULING IN WIRELESS COMMUNICATIONS

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 18/525,240

(22) Filed: Nov. 30, 2023

(65) Prior Publication Data

US 2024/0163912 A1 May 16, 2024

Related U.S. Application Data

(63) Continuation of application No. 16/993,121, filed on Aug. 13, 2020, now Pat. No. 11,864,216.

(30) Foreign Application Priority Data

Sep. 30, 2019 (IN) .............................. 201941039483

(51) Int. Cl.
*H04L 1/00* (2006.01)
*H04L 1/1812* (2023.01)
(Continued)

(52) U.S. Cl.
CPC ......... *H04W 72/535* (2023.01); *H04L 1/0061* (2013.01); *H04L 1/1819* (2013.01);
(Continued)

(58) Field of Classification Search
None
See application file for complete search history.

(56) References Cited

U.S. PATENT DOCUMENTS 10,993,141 B2 4/2021 Huang et al.
2004/0084002 A1 5/2004 Mitsutani et al.
(Continued)

FOREIGN PATENT DOCUMENTS

WO WO2019028857 A1 2/2019

OTHER PUBLICATIONS

International Preliminary Report on Patentability—PCT/US2020/046468, The International Bureau of WIPO—Geneva, Switzerland, Apr. 14, 2022.
(Continued)

*Primary Examiner* — Luat Phung
(74) *Attorney, Agent, or Firm* — Holland & Hart LLP

(57) ABSTRACT

Methods, systems, and devices for wireless communications are described in which a user equipment (UE) may be configured with one or more semi-persistent scheduling (SPS) configurations. A base station may transmit a first downlink control information (DCI) transmission to the UE that activates an SPS configuration, and the first DCI may indicate a non-numeric feedback timeline for reporting associated acknowledgment feedback. The base station may transmit a subsequent second DCI transmission that provides feedback resources, and the UE may receive the second DCI and identify timing and resources for SPS acknowledgment feedback based on the second DCI. The UE may then transmit the acknowledgment feedback for one or more SPS transmissions in the feedback resources that are indicated by the second DCI transmission.

30 Claims, 19 Drawing Sheets

(51) Int. Cl.

| | |
|---|---|
| *H04L 5/00* | (2006.01) |
| *H04W 28/04* | (2009.01) |
| *H04W 72/23* | (2023.01) |
| *H04W 72/50* | (2023.01) |
| *H04W 76/11* | (2018.01) |

(52) U.S. Cl.

CPC ........... *H04L 5/0055* (2013.01); *H04W 28/04* (2013.01); *H04W 72/23* (2023.01); *H04W 76/11* (2018.02)

(56) References Cited

U.S. PATENT DOCUMENTS

| | | | | |
|---|---|---|---|---|
| 2011/0003555 | A1 | 1/2011 | Guo | |
| 2016/0226630 | A1 | 8/2016 | Zhang et al. | |
| 2016/0295561 | A1 | 10/2016 | Papasakellariou | |
| 2017/0373802 | A1* | 12/2017 | Bergström | ............ H04W 72/23 |
| 2018/0279274 | A1* | 9/2018 | Sun | ........................ H04L 1/1864 |
| 2019/0132092 | A1* | 5/2019 | Chen | ..................... H04W 72/23 |
| 2019/0306923 | A1 | 10/2019 | Xiong et al. | |
| 2019/0349908 | A1 | 11/2019 | Talarico et al. | |
| 2020/0067574 | A1 | 2/2020 | Yang et al. | |
| 2020/0213975 | A1 | 7/2020 | Chae et al. | |
| 2020/0267597 | A1 | 8/2020 | Huang et al. | |
| 2020/0313809 | A1 | 10/2020 | Park et al. | |
| 2021/0100013 | A1 | 4/2021 | Khoshnevisan et al. | |
| 2021/0266941 | A1* | 8/2021 | Park | ...................... H04L 1/1861 |
| 2022/0095337 | A1* | 3/2022 | Wang | ................... H04L 5/0053 |
| 2022/0149997 | A1* | 5/2022 | Wang | .................... H04L 1/1822 |
| 2022/0239445 | A1* | 7/2022 | Yoshioka | .............. H04W 72/23 |
| 2024/0414704 | A1* | 12/2024 | Takahashi | ......... H04W 72/1263 |

OTHER PUBLICATIONS

International Search Report and Written Opinion—PCT/US2020/046468—ISA/EPO—Nov. 12, 2020.

Samsung: "HARQ-ACK Feedback Timing", 3GPP Draft; R1-1713644, 3rd Generation Partnership Project (3GPP), Mobile Competence Centre, 650, Route Des Lucioles, F-06921 Sophia-Antipolis Cedex, France, vol. RAN WG1, No. Prague, CZ; Aug. 21, 2017-Aug. 25, 2017 Aug. 20, 2017, XP051316444, Retrieved from the Internet: URL:http://www.3gpp.org/ftp/Meetings_3GPP_SYNC/RAN1/Docs/ "title="Link:http://www.3gpp.org/ftp/Meetings_3GPP_SYNC/RAN1/Docs/">http://www.3gpp.org/ftp/Meetings_3GPP_SYNC/RAN1/Docs/ [retrieved on Aug. 20, 2017], 3 pages.

* cited by examiner 510        515        520

505

500

Figure 13:
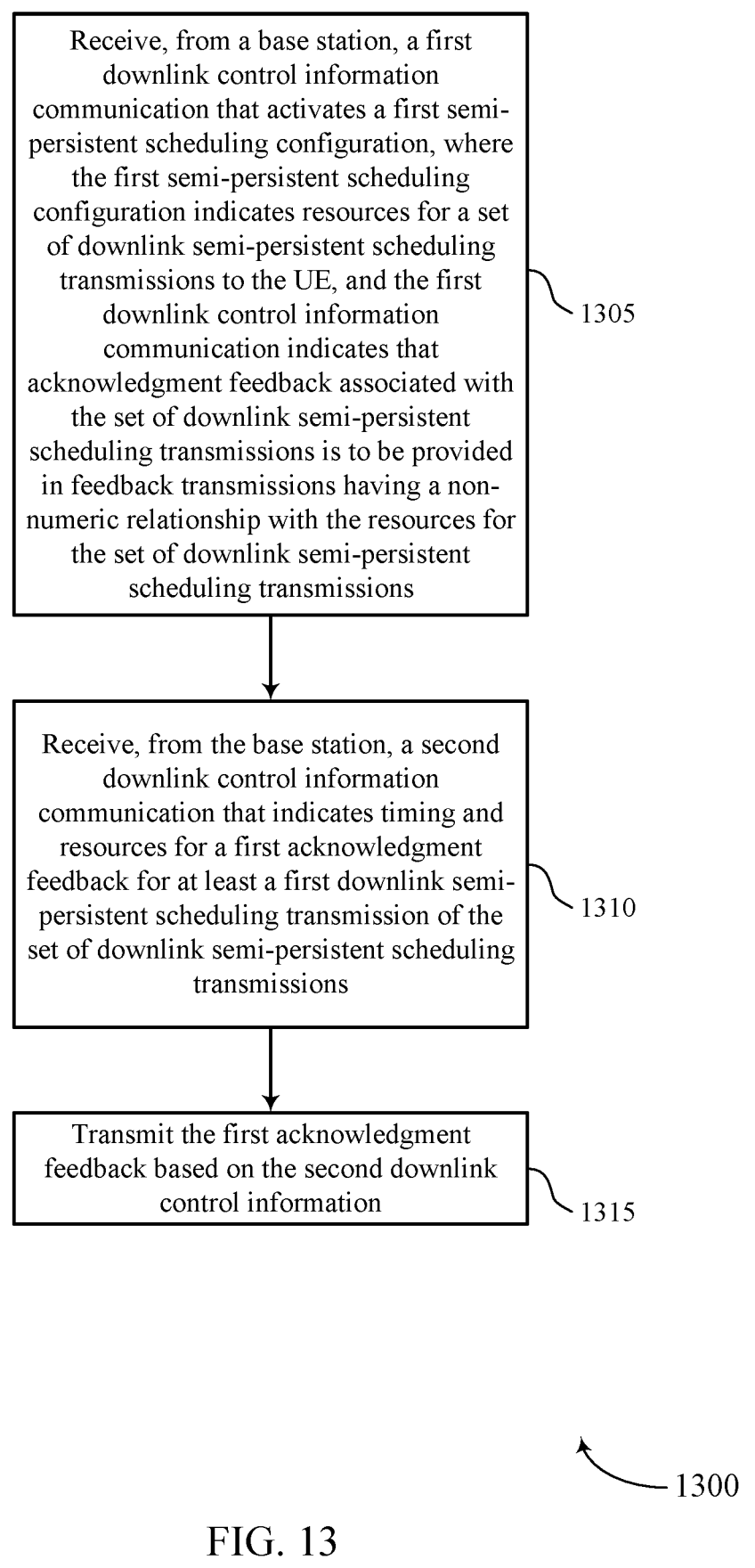

Receive, from a base station, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions

1305

Receive, from the base station, a second downlink control information communication that indicates timing and resources for a first acknowledgment feedback for at least a first downlink semi-persistent scheduling transmission of the set of downlink semi-persistent scheduling transmissions

1310

Transmit the first acknowledgment feedback based on the second downlink control information

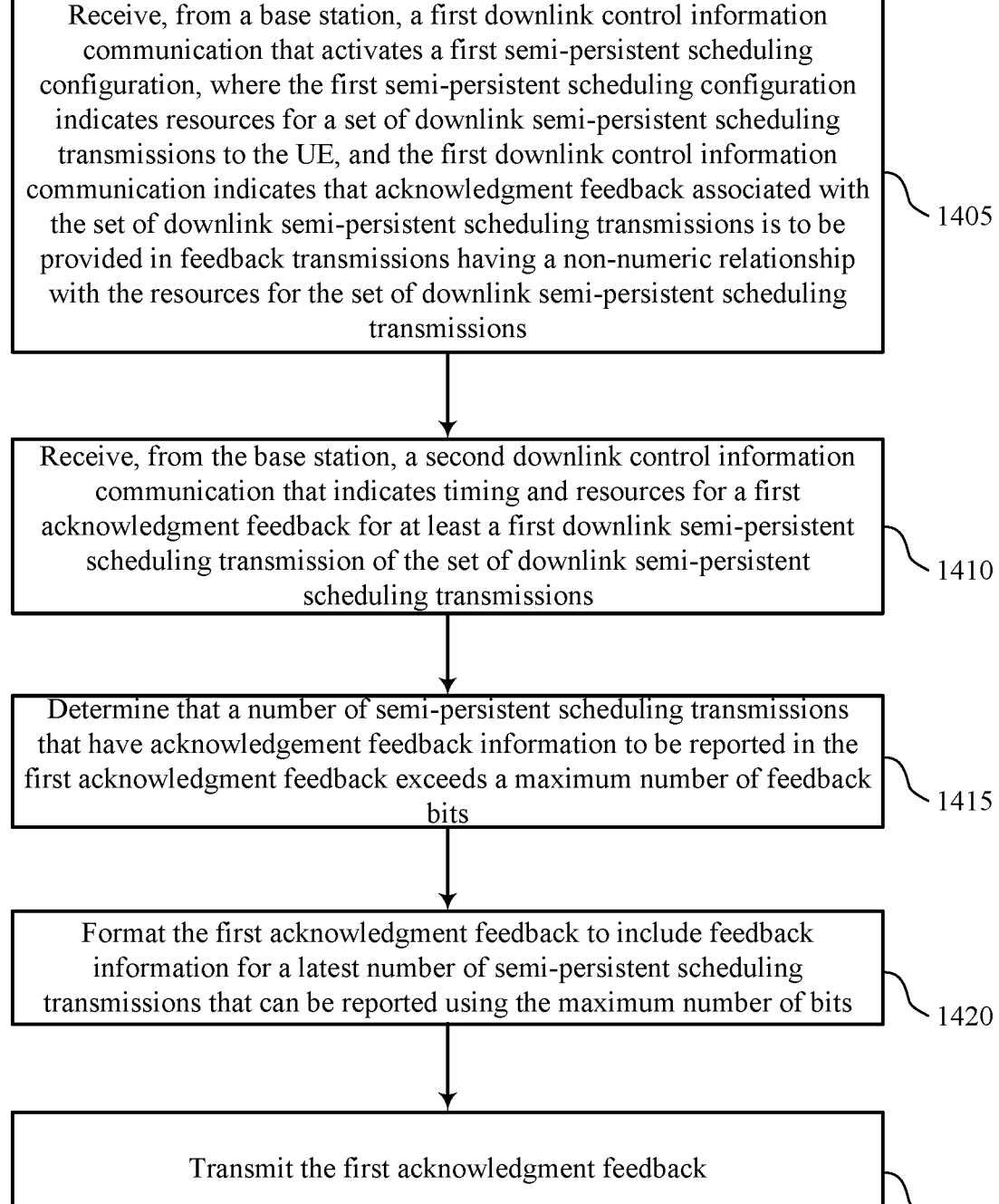

Receive, from a base station, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions

1405

Receive, from the base station, a second downlink control information communication that indicates timing and resources for a first acknowledgment feedback for at least a first downlink semi-persistent scheduling transmission of the set of downlink semi-persistent scheduling transmissions

1410

Determine that a number of semi-persistent scheduling transmissions that have acknowledgement feedback information to be reported in the first acknowledgment feedback exceeds a maximum number of feedback bits

1415

Format the first acknowledgment feedback to include feedback information for a latest number of semi-persistent scheduling transmissions that can be reported using the maximum number of bits

1420

Transmit the first acknowledgment feedback

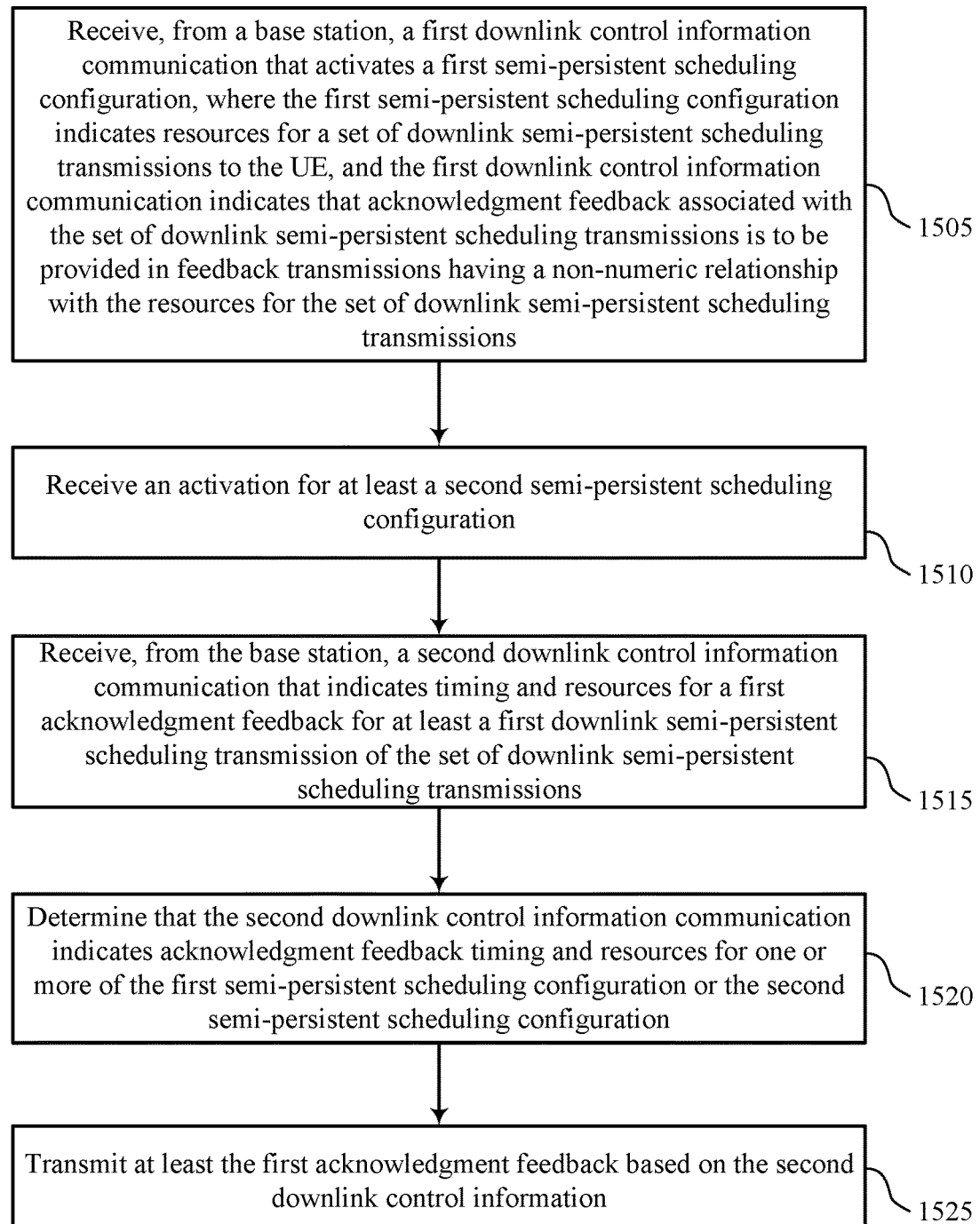

Receive, from a base station, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions

1505

Receive an activation for at least a second semi-persistent scheduling configuration

1510

Receive, from the base station, a second downlink control information communication that indicates timing and resources for a first acknowledgment feedback for at least a first downlink semi-persistent scheduling transmission of the set of downlink semi-persistent scheduling transmissions

1515

Determine that the second downlink control information communication indicates acknowledgment feedback timing and resources for one or more of the first semi-persistent scheduling configuration or the second semi-persistent scheduling configuration

1520

Transmit at least the first acknowledgment feedback based on the second downlink control information

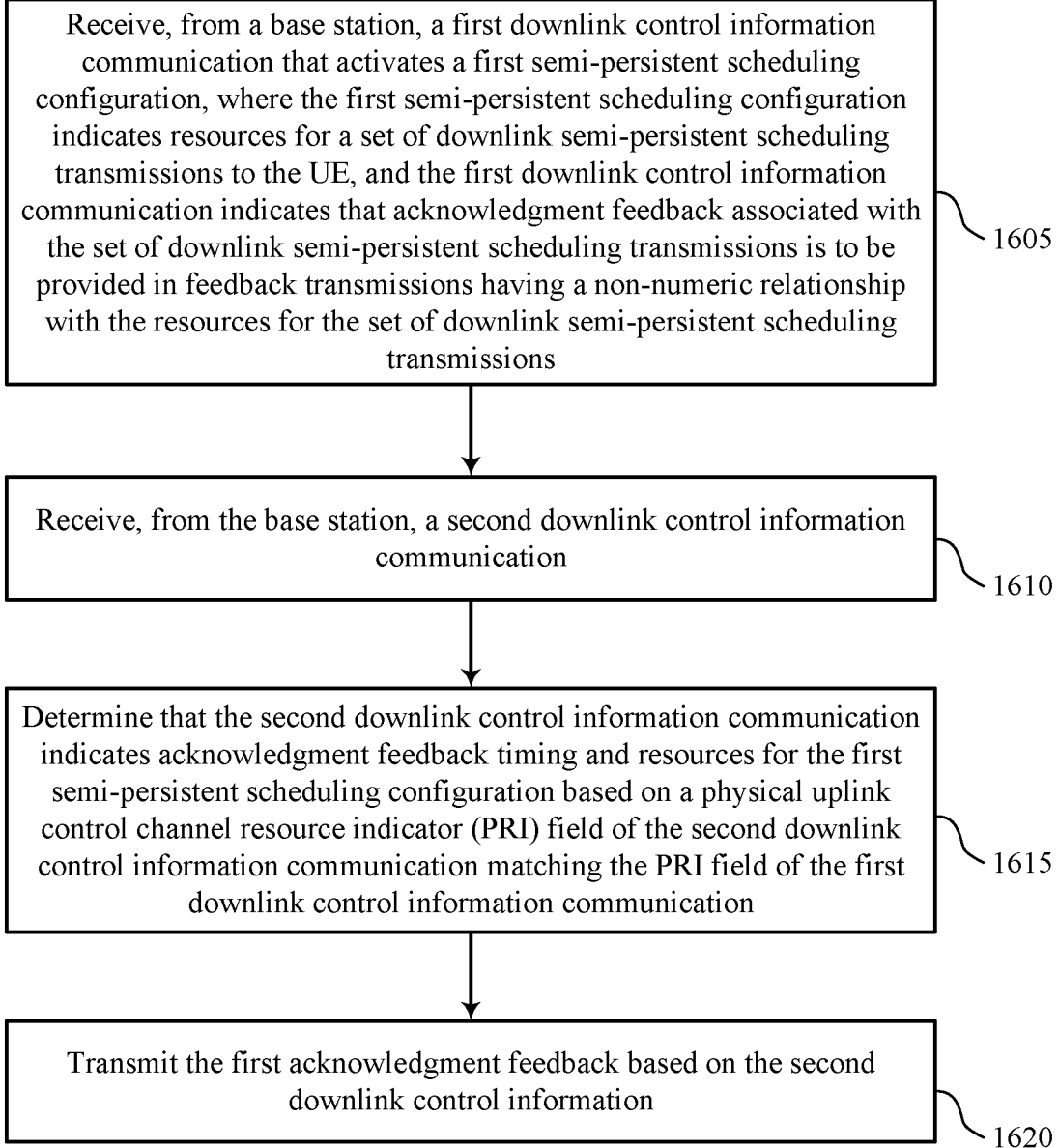

Receive, from a base station, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions

1605

Receive, from the base station, a second downlink control information communication

1610

Determine that the second downlink control information communication indicates acknowledgment feedback timing and resources for the first semi-persistent scheduling configuration based on a physical uplink control channel resource indicator (PRI) field of the second downlink control information communication matching the PRI field of the first downlink control information communication

1615

Transmit the first acknowledgment feedback based on the second downlink control information

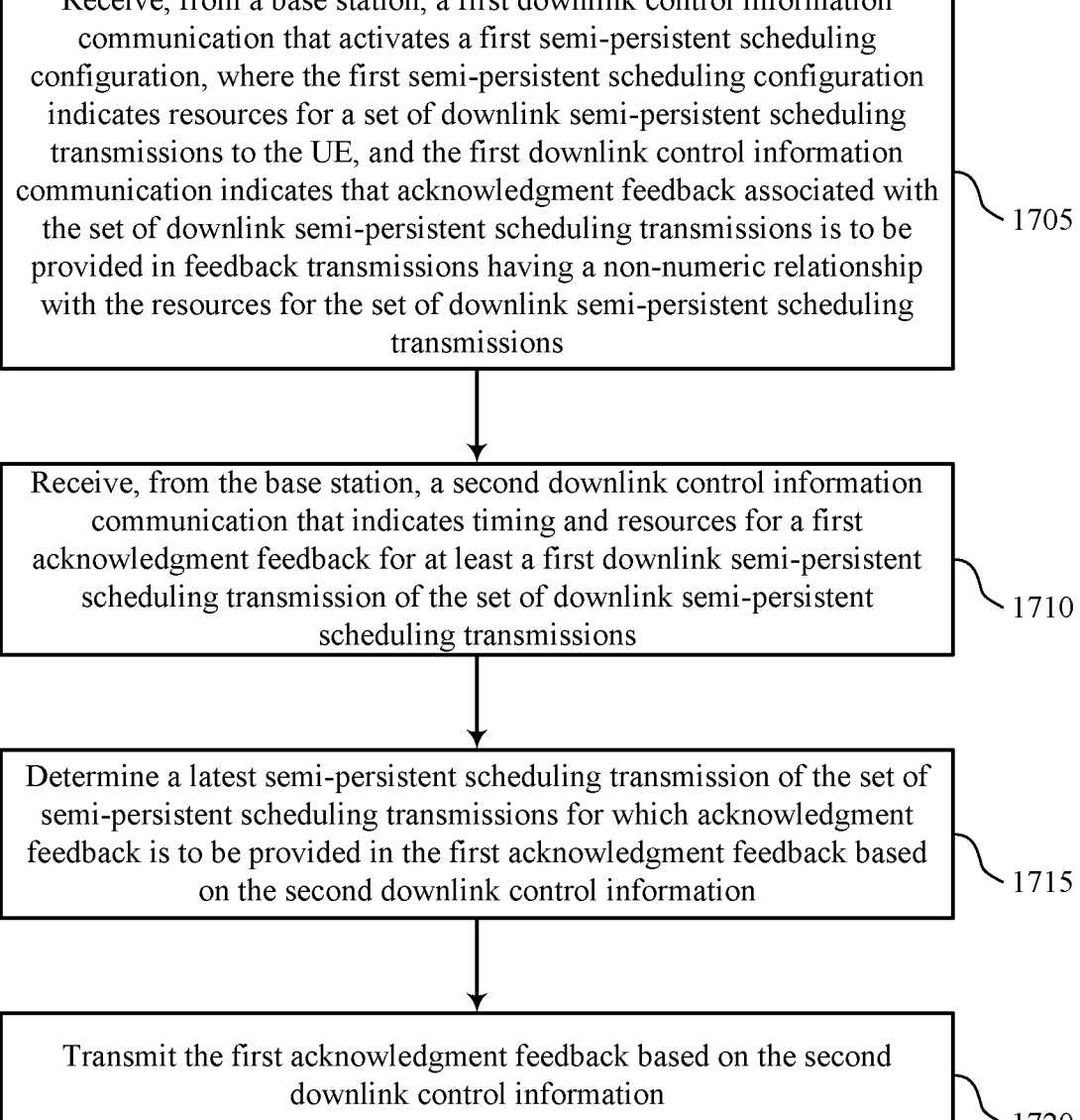

Receive, from a base station, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions
— 1705

Receive, from the base station, a second downlink control information communication that indicates timing and resources for a first acknowledgment feedback for at least a first downlink semi-persistent scheduling transmission of the set of downlink semi-persistent scheduling transmissions
— 1710

Determine a latest semi-persistent scheduling transmission of the set of semi-persistent scheduling transmissions for which acknowledgment feedback is to be provided in the first acknowledgment feedback based on the second downlink control information
— 1715

Transmit the first acknowledgment feedback based on the second downlink control information
— 1720

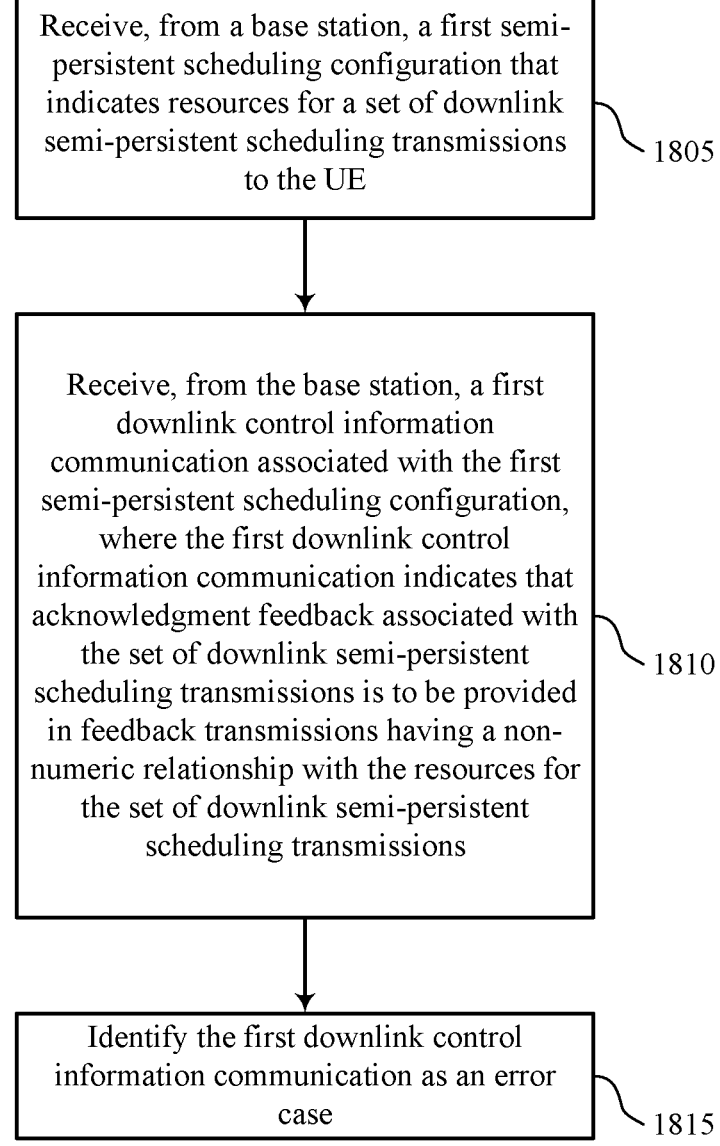

Receive, from a base station, a first semi-persistent scheduling configuration that indicates resources for a set of downlink semi-persistent scheduling transmissions to the UE ⟍ 1805

Receive, from the base station, a first downlink control information communication associated with the first semi-persistent scheduling configuration, where the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions ⟍ 1810

Identify the first downlink control information communication as an error case ⟍ 1815

Figure 19:
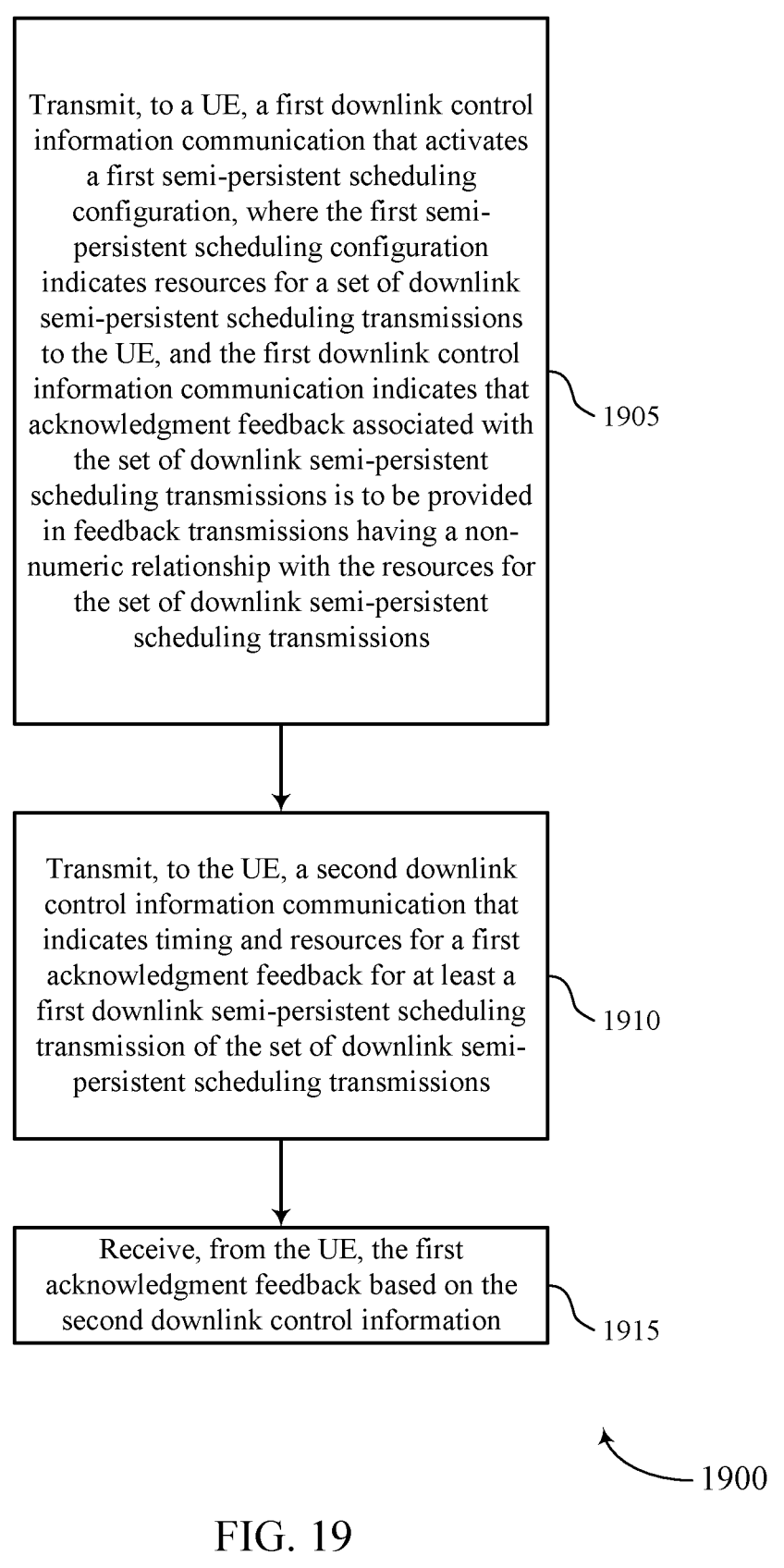

Transmit, to a UE, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions ⟩ 1905

Transmit, to the UE, a second downlink control information communication that indicates timing and resources for a first acknowledgment feedback for at least a first downlink semi-persistent scheduling transmission of the set of downlink semi-persistent scheduling transmissions ⟩ 1910

Receive, from the UE, the first acknowledgment feedback based on the second downlink control information ⟩ 1915

ACKNOWLEDGMENT FEEDBACK FOR SEMI-PERSISTENT SCHEDULING IN WIRELESS COMMUNICATIONS

CROSS REFERENCE

The present Application for Patent is a Continuation of U.S. patent application Ser. No. 16/993,121 by Khoshnevisan et al., entitled "ACKNOWLEDGEMENT FEEDBACK FOR SEMI-PERSISTENT SCHEDULING IN WIRELESS COMMUNICATIONS" filed Aug. 13, 2020, which claims the benefit of India Patent Application No. 201941039483 by Khoshnevisan et al., entitled "ACKNOWLEDGMENT FEEDBACK FOR SEMI-PERSISTENT SCHEDULING IN WIRELESS COMMUNICATIONS," filed Sep. 30, 2019, each of which are assigned to the assignee hereof, and each of which are expressly incorporated by reference in its entirety herein.

BACKGROUND

The following relates generally to wireless communications, and more specifically to acknowledgment feedback for semi-persistent scheduling in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support acknowledgment feedback to indicate if a wireless device (e.g., a UE) successfully decodes downlink messages (e.g., data transmissions) where the downlink message decoding is based on one or more detected downlink control messages (e.g., a downlink grant or downlink control information (DCI)). The acknowledgment feedback may be provided in an acknowledgment feedback report. In some cases, the acknowledgment report may include acknowledgment feedback for two or more transmissions (e.g., two or more downlink transmissions to a UE), and may be transmitted based on a specified timing following a transmission (e.g., a n+K1 timeline where K1 is a number of slots after the downlink transmission that the acknowledgment feedback is to be transmitted). In some cases, such as in deployments supporting shared or unlicensed radio frequency spectrums (e.g., unlicensed NR), a non-numeric timeline for feedback reporting may be configured, in which a UE transmits acknowledgment feedback for multiple transmissions when triggered to do so by the base station. Further, in some cases a wireless device (e.g., a UE) may be configured with a semi-persistent scheduling configuration in which multiple transmissions may be transmitted according to a periodic pattern. Techniques to enhance system performance for acknowledgment feedback are desirable.

SUMMARY

The described techniques relate to improved methods, systems, devices, and apparatuses that support acknowledgment feedback for semi-persistent scheduling (SPS) in wireless communications. In various aspects, a user equipment (UE) may be configured with an SPS configuration that provides resources for a number of downlink SPS transmissions to the UE. The SPS configuration may be activated by a downlink control information (DCI) transmission, and the DCI may, in some cases, indicate a non-numeric feedback timeline for reporting acknowledgment feedback (e.g., hybrid acknowledgment repeat request (HARD) acknowledgment/negative-acknowledgment (ACK/NACK) feedback). The UE may receive a subsequent second DCI transmission that provides feedback resources, and the UE may transmit acknowledgment feedback for one or more SPS transmissions in the feedback resources that are indicated by the second DCI transmission.

A method of wireless communications at a UE is described. The method may include receiving, from a base station, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions, receiving, from the base station, a second downlink control information communication that indicates timing and resources for a first acknowledgment feedback for at least a first downlink semi-persistent scheduling transmission of the set of downlink semi-persistent scheduling transmissions, and transmitting the first acknowledgment feedback based on the second downlink control information.

An apparatus for wireless communications at a UE is described. The apparatus may include a processor, memory coupled with the processor, and instructions stored in the memory. The instructions may be executable by the processor to cause the apparatus to receive, from a base station, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions, receive, from the base station, a second downlink control information communication that indicates timing and resources for a first acknowledgment feedback for at least a first downlink semi-persistent scheduling transmission of the set of downlink semi-persistent scheduling transmissions, and transmit the first acknowledgment feedback based on the second downlink control information.

Another apparatus for wireless communications at a UE is described. The apparatus may include means for receiving, from a base station, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions, receiving, from the base station, a second downlink control information communication that indicates timing and resources for a first acknowledgment feedback for at least a first downlink semi-persistent scheduling transmission of the set of downlink semi-persistent scheduling transmissions, and transmitting the first acknowledgment feedback based on the second downlink control information.

A non-transitory computer-readable medium storing code for wireless communications at a UE is described. The code may include instructions executable by a processor to receive, from a base station, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions, receive, from the base station, a second downlink control information communication that indicates timing and resources for a first acknowledgment feedback for at least a first downlink semi-persistent scheduling transmission of the set of downlink semi-persistent scheduling transmissions, and transmit the first acknowledgment feedback based on the second downlink control information.

In some examples of the method, apparatuses, and non-transitory computer-readable medium described herein, the receiving the second downlink control information communication may include operations, features, means, or instructions for detecting a downlink control information communication after receiving the first downlink control information communication that includes an indication of uplink transmission resources for the first acknowledgment feedback. In some examples of the method, apparatuses, and non-transitory computer-readable medium described herein, the second downlink control information communication schedules a downlink shared channel transmission separate from the first semi-persistent scheduling configuration, schedules a retransmission of a previously transmitted semi-persistent scheduling configuration transmission, provides an activation update to the first semi-persistent scheduling configuration, activates a different semi-persistent scheduling configuration, or any combinations thereof. Some examples of the method, apparatuses, and non-transitory computer-readable medium described herein may further include operations, features, means, or instructions for identifying the second downlink control information communication based on an associated cyclic redundancy check (CRC) that is scrambled by one or more of a cell radio network temporary identifier (C-RNTI) associated with the UE or a configured scheduling RNTI (CS-RNTI) associated with the UE.

In some examples of the method, apparatuses, and non-transitory computer-readable medium described herein, a maximum number of feedback bits associated with one or more downlink semi-persistent scheduling transmissions of the plurality of downlink semi-persistent scheduling transmissions to be included in the first acknowledgment feedback corresponds to a number of hybrid acknowledgment repeat request (HARQ) processes configured in the first semi-persistent scheduling configuration. Some examples of the method, apparatuses, and non-transitory computer-readable medium described herein may further include operations, features, means, or instructions for determining that a number of semi-persistent scheduling transmissions that have acknowledgement feedback information to be reported in the first acknowledgment feedback exceeds the maximum number of feedback bits, and formatting the first acknowledgment feedback to include feedback information for a latest number of semi-persistent scheduling transmissions that can be reported using the maximum number of bits.

Some examples of the method, apparatuses, and non-transitory computer-readable medium described herein may further include operations, features, means, or instructions for receiving an activation indication for at least a second semi-persistent scheduling configuration, and where a maximum number of feedback bits for each of the first semi-persistent scheduling configuration and the second semi-persistent scheduling configuration is provided as part of the respective first semi-persistent scheduling configuration and second semi-persistent scheduling configuration. In some examples of the method, apparatuses, and non-transitory computer-readable medium described herein, the first acknowledgment feedback includes two or more bits corresponding to two or more semi-persistent scheduling transmissions and is appended to a dynamic feedback codebook associated with at least a first regular downlink transmission to the UE.

Some examples of the method, apparatuses, and non-transitory computer-readable medium described herein may further include operations, features, means, or instructions for receiving an activation for at least a second semi-persistent scheduling configuration, and determining that the second downlink control information communication indicates acknowledgment feedback timing and resources for one or more of the first semi-persistent scheduling configuration or the second semi-persistent scheduling configuration. In some examples of the method, apparatuses, and non-transitory computer-readable medium described herein, the second downlink control information communication includes an explicit indication of which of the first semi-persistent scheduling configuration, the second semi-persistent scheduling configuration, one or more other semi-persistent scheduling configurations, or combinations thereof, are to provide acknowledgment feedback using the indicated acknowledgement feedback timing and resources. In some examples of the method, apparatuses, and non-transitory computer-readable medium described herein, each semi-persistent scheduling configuration is associated with a component carrier of two or more component carriers, and which of one or more of the first semi-persistent scheduling configuration or the second semi-persistent scheduling configuration is to provide feedback information using the indicated acknowledgement feedback timing and resources is determined based on the component carrier used to communicate the second downlink control information communication.

Some examples of the method, apparatuses, and non-transitory computer-readable medium described herein may further include operations, features, means, or instructions for determining that the first semi-persistent scheduling configuration and a second semi-persistent scheduling configuration are in the same physical uplink control channel (PUCCH) group, and where the second downlink control information communication indicates timing and resources for the first acknowledgment feedback that includes feedback information for downlink semi-persistent scheduling transmissions of the plurality of downlink semi-persistent scheduling transmissions corresponding to the first semi-persistent scheduling configuration and the second semi-persistent scheduling configuration based on the determining. Some examples of the method, apparatuses, and non-transitory computer-readable medium described herein may further include operations, features, means, or instructions for determining that the second downlink control information communication indicates acknowledgment feedback timing and resources for the first semi-persistent scheduling configuration based on a physical uplink control channel resource indicator (PM) field of the second downlink control information communication matching the PM field of the first downlink control information communication.

In some examples of the method, apparatuses, and non-transitory computer-readable medium described herein, the second downlink control information may be determined to provide the timing and resources for the first acknowledgment feedback when one or more hybrid acknowledgment repeat request (HARQ) process IDs indicated in the second downlink control information correspond to one or more HARQ process IDs configured for the first semi-persistent scheduling configuration. In some examples of the method, apparatuses, and non-transitory computer-readable medium described herein, the first semi-persistent scheduling configuration is associated with a downlink transmission group, and the second downlink control information communication is associated a same downlink transmission group as the first downlink control information communication.

In some examples of the method, apparatuses, and non-transitory computer-readable medium described herein, the first acknowledgment feedback includes information for one or more semi-persistent scheduling transmissions that are within a threshold number of slots prior to the resources for acknowledgment feedback that is indicated by the second downlink control information communication.

Some examples of the method, apparatuses, and non-transitory computer-readable medium described herein may further include operations, features, means, or instructions for determining a latest semi-persistent scheduling transmission of the set of semi-persistent scheduling transmissions for which acknowledgment feedback is to be provided in the first acknowledgment feedback based on the second downlink control information. In some examples of the method, apparatuses, and non-transitory computer-readable medium described herein, the determining further may include operations, features, means, or instructions for determining a last semi-persistent scheduling transmission of the set of semi-persistent scheduling transmissions that has been received at the UE prior to a UE processing timeline for reporting acknowledgment feedback. In some examples of the method, apparatuses, and non-transitory computer-readable medium described herein, the determining further may include operations, features, means, or instructions for determining a last semi-persistent scheduling transmission of the set of semi-persistent scheduling transmissions that has been received at the UE prior to receiving the second downlink control information communication. In some examples of the method, apparatuses, and non-transitory computer-readable medium described herein, the determining further may include operations, features, means, or instructions for determining a last semi-persistent scheduling transmission of the set of semi-persistent scheduling transmissions that may has received at the UE at a latest semi-persistent scheduling transmission prior to a downlink shared channel transmission that is scheduled by the second downlink control information communication. In some examples of the method, apparatuses, and non-transitory computer-readable medium described herein, the latest semi-persistent scheduling transmission may be determined per semi-persistent scheduling configuration when multiple semi-persistent scheduling configurations are active or is determined across multiple active semi-persistent scheduling configurations.

In some examples of the method, apparatuses, and non-transitory computer-readable medium described herein, an order of feedback bits of the acknowledgment feedback may be determined based on a predetermined rule set. In some examples of the method, apparatuses, and non-transitory computer-readable medium described herein, the order of feedback bits of the acknowledgment feedback corresponds to an order in which each corresponding semi-persistent scheduling transmission is received at the UE. In some examples of the method, apparatuses, and non-transitory computer-readable medium described herein, the order of feedback bits of the acknowledgment feedback corresponds to an order of hybrid acknowledgment repeat request (HARQ) process IDs associated with each semi-persistent scheduling transmission for which acknowledgment feedback is provided.

In some examples of the method, apparatuses, and non-transitory computer-readable medium described herein, the UE maintains the non-numeric relationship for timing between the acknowledgment feedback and the resources for the set of downlink semi-persistent scheduling transmissions after the transmitting. In some examples of the method, apparatuses, and non-transitory computer-readable medium described herein, a timing between subsequent semi-persistent scheduling transmissions and a subsequent corresponding acknowledgment feedback transmission is based on the indicated timing in the second downlink control information communication. In some examples of the method, apparatuses, and non-transitory computer-readable medium described herein, the second downlink control information communication provides an activation update for the first semi-persistent scheduling configuration with a numeric relationship for timing between the subsequent acknowledgment feedback and the resources for the subsequent semi-persistent scheduling transmissions.

In some examples of the method, apparatuses, and non-transitory computer-readable medium described herein, the second downlink control information communication provides uplink scheduling information for one or more uplink communications from the UE, and where the first acknowledgment feedback is multiplexed with one or more of the uplink communications from the UE. In some examples of the method, apparatuses, and non-transitory computer-readable medium described herein, the second downlink control information communication does not schedule an associated downlink or uplink transmission.

In some examples of the method, apparatuses, and non-transitory computer-readable medium described herein, the second downlink control information communication includes one or more fields that indicate the timing and resources for the acknowledgment feedback, and one or more fields that indicate a downlink or uplink data transmission is not scheduled by the second downlink control information communication. In some examples of the method, apparatuses, and non-transitory computer-readable medium described herein, the second downlink control information communication may be a group common downlink control information communication. In some examples of the method, apparatuses, and non-transitory computer-readable medium described herein, the group common downlink control information communication indicates the timing and resources for acknowledgment feedback for multiple UEs.

In some examples of the method, apparatuses, and non-transitory computer-readable medium described herein, the first acknowledgment feedback includes a first number of feedback bits that correspond to a configured number of hybrid acknowledgment repeat request (HARQ) processes indicated in the first semi-persistent scheduling configuration. In some examples of the method, apparatuses, and non-transitory computer-readable medium described herein, the first acknowledgment feedback includes feedback information for a second number of semi-persistent scheduling transmissions that is fewer than the first number of feedback bits, and the UE reports a negative acknowledgment or a previous value for each feedback bit of the first number of feedback bits that does not have an associated semi-persistent scheduling transmission in the second number of semi-persistent scheduling transmissions.

A method of wireless communications at a UE is described. The method may include receiving, from a base station, a first semi-persistent scheduling configuration that indicates resources for a set of downlink semi-persistent scheduling transmissions to the UE, receiving, from the base station, a first downlink control information communication associated with the first semi-persistent scheduling configuration, where the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions, and identifying the first downlink control information communication as an error case.

An apparatus for wireless communications at a UE is described. The apparatus may include a processor, memory coupled with the processor, and instructions stored in the memory. The instructions may be executable by the processor to cause the apparatus to receive, from a base station, a first semi-persistent scheduling configuration that indicates resources for a set of downlink semi-persistent scheduling transmissions to the UE, receive, from the base station, a first downlink control information communication associated with the first semi-persistent scheduling configuration, where the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions, and identify the first downlink control information communication as an error case.

Another apparatus for wireless communications at a UE is described. The apparatus may include means for receiving, from a base station, a first semi-persistent scheduling configuration that indicates resources for a set of downlink semi-persistent scheduling transmissions to the UE, receiving, from the base station, a first downlink control information communication associated with the first semi-persistent scheduling configuration, where the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions, and identifying the first downlink control information communication as an error case.

A non-transitory computer-readable medium storing code for wireless communications at a UE is described. The code may include instructions executable by a processor to receive, from a base station, a first semi-persistent scheduling configuration that indicates resources for a set of downlink semi-persistent scheduling transmissions to the UE, receive, from the base station, a first downlink control information communication associated with the first semi-persistent scheduling configuration, where the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions, and identify the first downlink control information communication as an error case.

Some examples of the method, apparatuses, and non-transitory computer-readable medium described herein may further include operations, features, means, or instructions for ignoring the first downlink control information communication based on the error case identification.

In some examples of the method, apparatuses, and non-transitory computer-readable medium described herein, the first semi-persistent scheduling configuration indicates that acknowledgment feedback associated with the plurality of downlink semi-persistent scheduling transmissions provided in feedback transmissions having a non-numeric relationship with the resources for the plurality of downlink semi-persistent scheduling transmissions is prohibited.

In some examples of the method, apparatuses, and non-transitory computer-readable medium described herein, identifying the error case is based on the indication that the indication that acknowledgement feedback provided in feedback transmissions having a non-numeric relationship with the resources for the plurality of downlink semi-persistent scheduling transmissions is prohibited.

BRIEF DESCRIPTION OF THE DRAWINGS

FIGS. 13 through 19 show flowcharts illustrating methods that support acknowledgment feedback for semi-persistent scheduling in wireless communications in accordance with aspects of the present disclosure.

DETAILED DESCRIPTION

Figure 1:
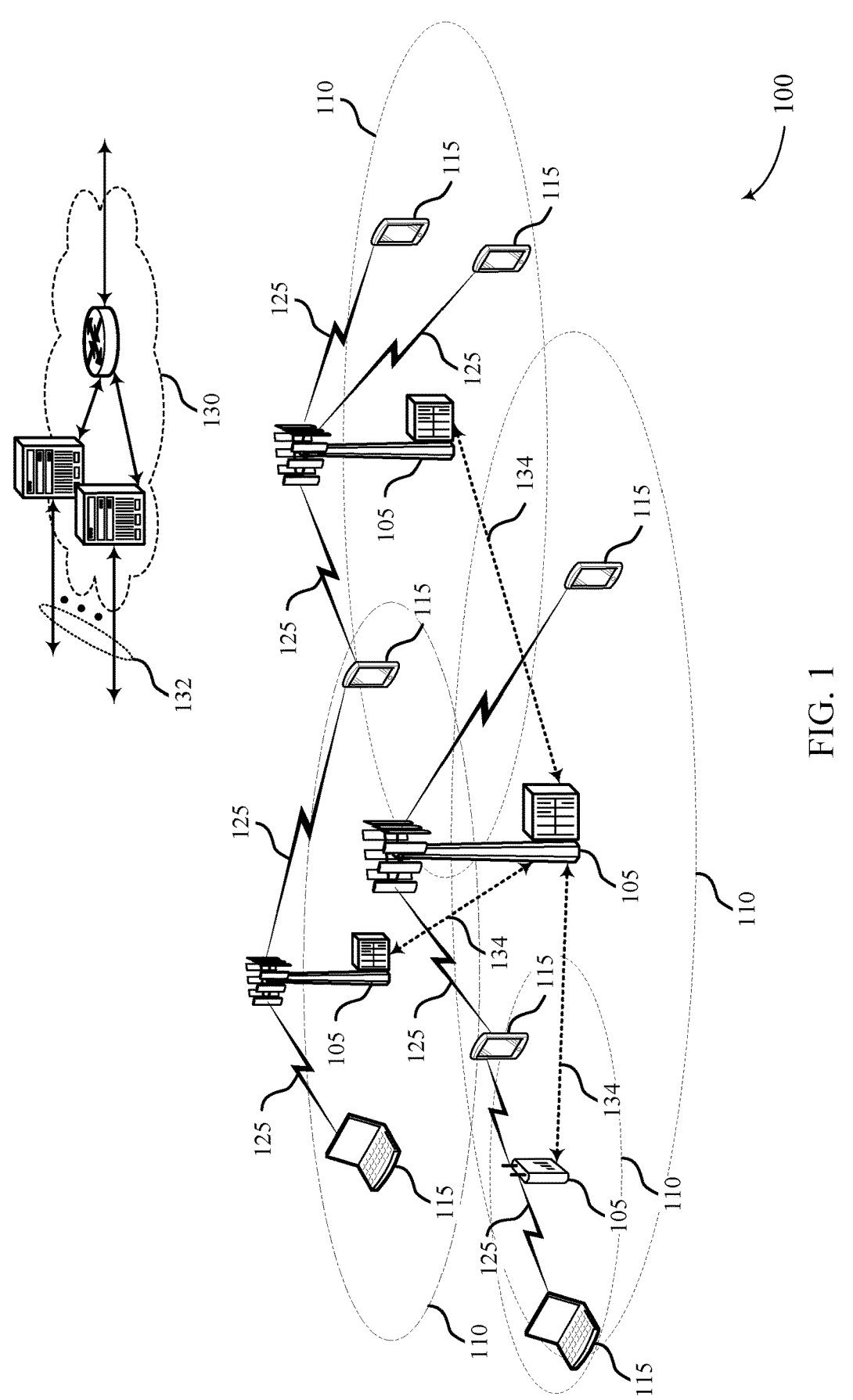
FIG. 1 illustrates an example of a system for wireless communications that supports acknowledgment feedback for semi-persistent scheduling in wireless communications in accordance with aspects of the present disclosure.

The described aspects of the disclosure relate to improved methods, systems, devices, or apparatuses that facilitate feedback for transmissions or retransmissions, such as hybrid automatic repeat request (HARQ) acknowledgment/negative-acknowledgment (ACK/NACK) feedback reports. In some examples, the techniques described herein enable efficient feedback reporting of semi-persistent scheduling (SPS) transmissions for one or more SPS configurations that may be enabled at a user equipment (UE). In some cases, an SPS configuration may be activated by a downlink control information (DCI) communication that indicates that an acknowledgment feedback timeline for reporting acknowledgment feedback associated with SPS transmissions is a non-numeric timeline. Such a non-numeric feedback timeline may provide that acknowledgment feedback is provided by the UE using timing and wireless resources that are separately indicated by a base station. Such a non-numeric feedback timeline allows additional scheduling flexibility at the base station and may help enhance system efficiency. For example, in systems that operate using shared or unlicensed spectrum, a base station may schedule acknowledgment feedback during a time period when the base station has gained access to the shared or unlicensed spectrum. In some cases, a second DCI communication may include timing and resources for the acknowledgment feedback, and the UE may transmit an acknowledgment feedback report that includes HARQ feedback for SPS transmissions, regular downlink transmissions (e.g., regular physical downlink shared channel (PDSCH) transmissions), or combinations thereof.

As discussed herein, acknowledgment feedback (e.g., HARQ ACK/NACK feedback) may be provided by a device that receives transmissions (e.g., a UE that receives PDSCH transmissions) according to a feedback timeline. In some cases, the feedback timeline may be a numeric feedback timeline in which a timing between receiving a communication and providing acknowledgment feedback is identified by a value (e.g., a K1 value that indicates a number of slots after the PDSCH that the HARQ ACK/NACK is to be transmitted). For example, the slot for transmission of HARQ ACK/NACK for a PDSCH may be determined from a "PDSCH-to-HARQ_feedback timing indicator" field in the downlink DCI scheduling the PDSCH, which determines the K1 value for the PDSCH transmission (e.g., in DCI formats of DCI 1_0 (fallback DL DCI) where the field has three bits and indicates one of the values {1, 2, . . . , 8}, or DCI 1_1 (non-fallback DCI) where the field has up to three bits and indicates one of the entries of the higher layer parameter "dl-DataToUL-ACK" that is configured by radio resource control (RRC) signaling). A DCI may also provide a physical uplink control channel (PUCCH) resource indicator (PRI) field, which may be an index (e.g., indicated by a 3 bit index value) that is used to determine a PUCCH resource for acknowledgement feedback reporting in a given slot, where PRI in a latest received DCI is considered (among all the DCIs that have a value of K1 indicating a same slot for HARQ-ACK transmission).

In cases where an SPS configuration is activated, a DCI communication that activates the SPS may include information for acknowledgment feedback timing. For example, an activating DCI may include a value for K1 to be used for all SPS PDSCH receptions. A UE operating according to the SPS configuration may then determine PUCCH resources for acknowledgment feedback based on whether feedback for a regular non-SPS downlink transmission is to be also provided. For example, if the UE transmits HARQ ACK/NACK information corresponding only to a PDSCH reception without a corresponding physical downlink control channel (PDCCH) that schedules downlink traffic (e.g., an SPS PDSCH reception), the PUCCH resource for the corresponding PUCCH transmission with HARQ ACK/NACK feedback for only the SPS transmission(s) is determined by the SPS configuration (e.g., provided by a "n1PUCCH-AN" that is configured as part of the SPS configuration). If the UE has acknowledgment feedback for both SPS and regular PDSCH transmissions (e.g., if a reported feedback codebook also contains ACK/NACK for PDSCH scheduled by DCI), or for acknowledging receipt of a DCI that releases the SPS activation, a PRI field in the latest received DCI is used for the PUCCH resource selection.

Further, in cases where SPS is configured, two forms of acknowledgment may be used, one for acknowledgment feedback for PDSCH SPS reception, and another for SPS release. SPS feedback for a PDSCH SPS reception may include a one bit of HARQ ACK/NACK that is generated for PDSCH SPS reception, and may be indicated in a Type 1 codebook (semi-static), or a Type 2 codebook (dynamic). The Type 1 codebook may provide that the location of the HARQ ACK/NACK bit in the codebook corresponds to the actual received downlink SPS, and the Type 2 codebook provides that the UE may append the one bit ACK/NACK to the end of the HARQ-Ack codebook for PDSCH SPS reception (if SPS is activated and UE is configured to receive SPS PDSCH in a slot n-K1, where K1 is the PDSCH-to-HARQ-feedback timing value and n is the PUCCH slot in which the HARQ-ACK codebook is to be transmitted). For SPS release, a separate ACK/NACK may be provided if the corresponding DCI is received with a K1 value pointing to the same slot for PUCCH transmission of ACK/NACK, and the location is determined based on a downlink assignment indicator (DAI) in the dynamic codebook.

In accordance with various aspects of the present disclosure, techniques are provided that allow for efficient acknowledgment feedback reporting in cases where two or more SPS configurations are active, in cases where a non-numeric feedback timeline is indicated when SPS is activated, or combinations thereof. As discussed above, in some cases, a non-numerical feedback timeline may be provided as a value of the possible range of PDSCH-to-HARQ-timing-indicator values that may be used to indicate to the UE that the HARQ-ACK feedback for the corresponding PDSCH is postponed until the timing and resource for the HARQ ACK/NACK feedback is provided by the serving base station. In such cases, a UE that receives SPS transmissions may report feedback for one or more SPS transmissions based on the indicated timing and resources provided by the base station. In some cases, a second DCI may be received at a UE after a DCI that activates an SPS configuration with a non-numeric feedback timeline, and the UE may provide SPS acknowledgment feedback based on the timing and resources indicated in the second DCI.

Such techniques may enhance scheduling flexibility at the base station. Further, such scheduling flexibility may enhance operation in shared or unlicensed radio spectrum that may use contention-based access techniques, such that the base station may schedule acknowledgment feedback during channel occupancy times in which the base station and UE have access to the shared or unlicensed channel. Such techniques may thus enhance efficiency and flexibility in a wireless communications system. Additionally, such techniques may save uplink overhead to avoid unnecessary uplink transmission to provide acknowledgment feedback when the SPS PDSCH is not transmitted (e.g., SPS is activated, but in some instances SPS PDSCH is not sent). Further, in cases where the delay requirement is relatively relaxed, such techniques provide the base station with some flexibility to trigger the acknowledgment feedback transmission later. Additionally, acknowledgment feedback for more than one SPS reception may be provided in a single acknowledgment feedback report instead of sending a report for each SPS PDSCH reception separately.

Aspects of the disclosure are initially described in the context of a wireless communications system. Various examples of feedback timelines and techniques are then described. Aspects of the disclosure are further illustrated by and described with reference to apparatus diagrams, system diagrams, and flowcharts that relate to acknowledgment feedback for semi-persistent scheduling in wireless communications.

FIG. 1 illustrates an example of a wireless communications system 100 that supports acknowledgment feedback for semi-persistent scheduling in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, a UE 115 may be configured with one or more SPS configurations. A base station 105 may transmit a first DCI to the UE 115 that activates an SPS configuration, and the DCI may in some cases indicate a non-numeric feedback timeline for reporting acknowledgment feedback. The base station 105 may transmit a subsequent second DCI transmission that provides feedback resources, and the UE 115 may receive the second DCI and identify timing and resources for SPS acknowledgment feedback based on the second DCI. The UE 115 may then transmit the acknowledgment feedback for one or more SPS transmissions in the feedback resources that are indicated by the second DCI transmission.

Figure 2:
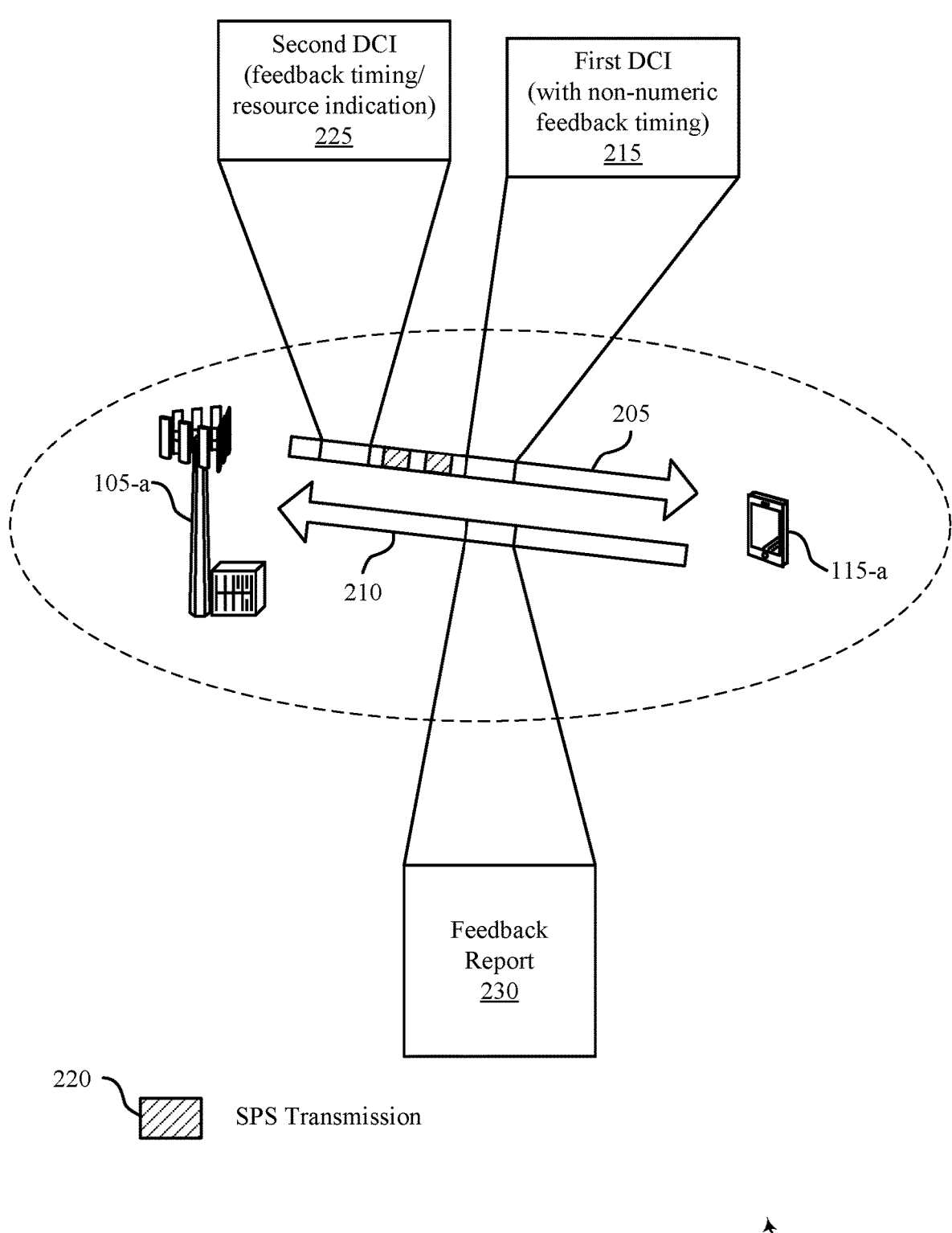
FIG. 2 illustrates an example of a wireless communications system that supports acknowledgment feedback for semi-persistent scheduling in wireless communications in accordance with aspects of the present disclosure.

FIG. 2 illustrates an example of a wireless communications system 200 that supports acknowledgment feedback for semi-persistent scheduling in wireless communications in accordance with aspects of the present disclosure. In some examples, wireless communications system 200 may implement aspects of wireless communications system 100. Wireless communications system 200 may include a base station 105-*a* and a UE 115-*a*, which may be examples of corresponding base stations 105 and UEs 115 as described with reference to FIG. 1.

As described herein, base station 105-*a* and UE 115-*a* may employ HARQ feedback techniques to indicate whether data has been received correctly at UE 115-*a*. For example, base station 105-*a* may transmit one or more downlink messages to UE 115-*a* on resources of a downlink carrier 205. Accordingly, UE 115-*a* may transmit an indication of whether the one or more downlink messages were received and decoded correctly on resources of an uplink carrier 210. In some cases, carriers 205 and 210 may be the same carrier. In some cases, carriers 205 and 210 may be component carriers (CCs), and a number of different CCs may be used for communications between the UE 115-*a* and the base station 105-*a*. In some cases, carriers 205 and 210 may use licensed spectrum, shared or unlicensed spectrum, or combinations thereof. When using unlicensed or shared spectrum, the UE 115-*a* and base station 105-*a* may use a contention-based access technique (e.g., a listen before talk (LBT) procedure) to determine if a channel is available prior to initiating transmissions.

As discussed herein, the base station 105-*a* may configure the UE 115-*a* with one or more SPS configurations. The SPS configurations may be provided to the UE 115-*a* using RRC signaling, for example. An SPS configuration may be activated at the UE 115-*a* by a first DCI 215, which may indicate that a first SPS configuration is activated, and that subsequent SPS PDSCH transmissions will be sent by the base station 105-*a*. Further, in some cases the first DCI 215 may provide a non-numeric feedback timing for the activated SPS configuration.

In some cases, the UE 115-*a* may not be configured to provide feedback according to a non-numeric feedback timeline, or may not be capable of providing acknowledgment feedback for SPS transmissions based on a non-numeric feedback timeline. Additionally, in some cases, a network may not be configured to allow for non-numeric feedback timing of SPS transmissions. Thus, in such cases where non-numeric SPS acknowledgment feedback is not configured or capable, a DCI activating the downlink SPS may indicate that a non-numeric K1 value is not allowed, and a first DCI 215 that indicates non-numeric feedback timing may be treated as an error case. The UE 115-*a* may ignore the first DCI 215 if it activates SPS but indicates non-numeric K1.

In other cases, the UE 115-*a* and the network may be configured for and capable of providing acknowledgment feedback according to a non-numeric feedback timeline. In such cases, following the first DCI 215, one or more SPS transmissions 220 may be transmitted to the UE 115-*a*. The base station 105-*a* may then schedule uplink resources (e.g., PUCCH resources) for acknowledgment feedback, and may transmit a second DCI 225 that indicates the timing and resources for the acknowledgment feedback. The UE 115-*a* may receive the second DCI 225 and identify the acknowledgment feedback resources and timing, and may transmit a feedback report 230 using the identified resources. In some cases, the feedback report 230 may include HARQ ACK/NACK feedback for one or more regular PDSCH transmissions in addition to one or more SPS PDSCH transmissions. For example, interspersed with the SPS transmissions 220, the UE 115-*a* may receive one or more other DCIs from the base station 105-*a* that schedule regular PDSCH transmissions and that indicate a non-numeric feedback timeline. The second DCI 225 may indicate timing and resources for both the regular PDSCH and SPS PDSCH transmissions. Various examples of feedback timelines with non-numeric timing are illustrated and discussed with reference to FIGS. 3 and 4.

Figure 3:
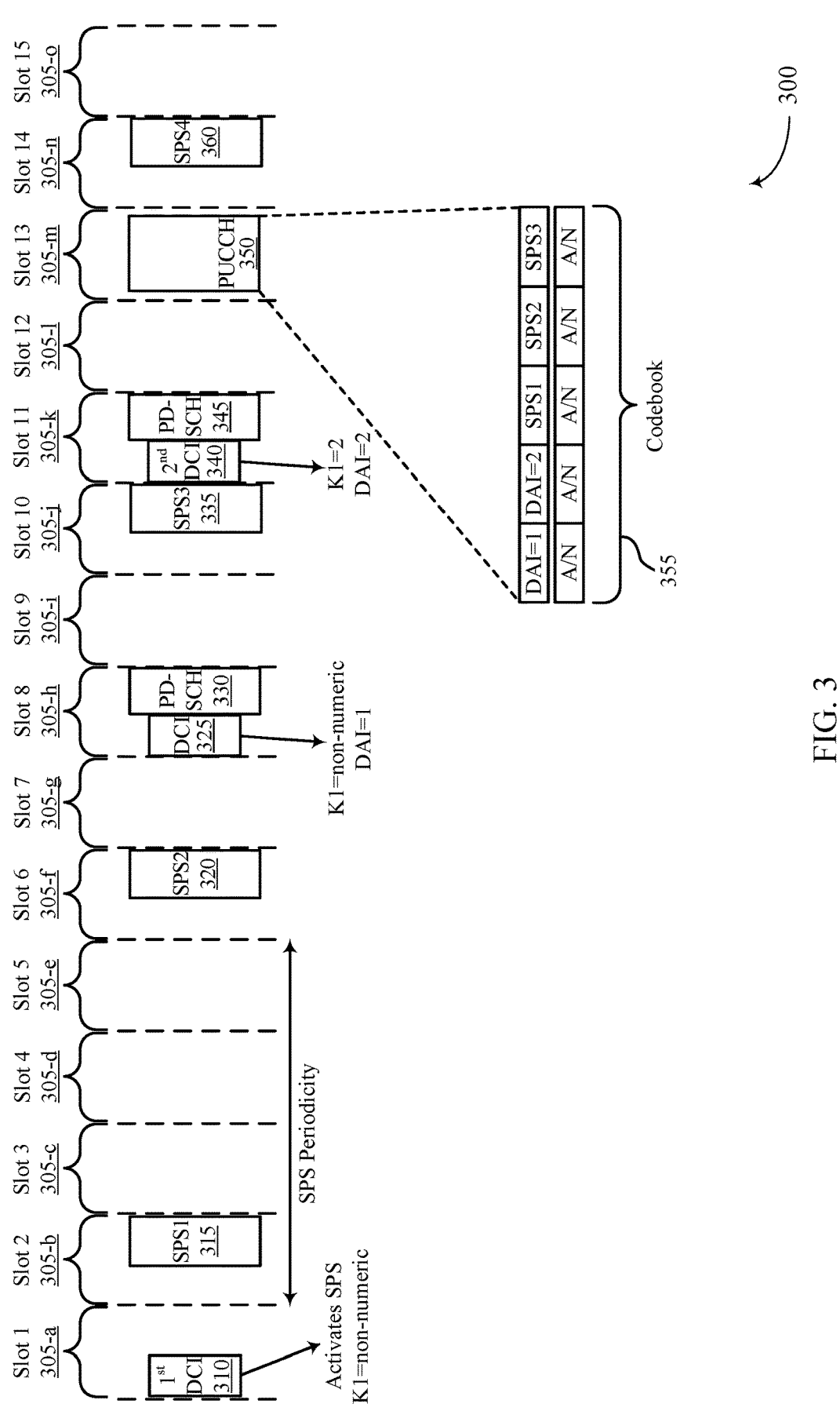
FIGS. 3 and 4 illustrate examples of feedback timelines that support acknowledgment feedback for semi-persistent scheduling in wireless communications in accordance with aspects of the present disclosure.

FIG. 3 illustrates an example of a feedback timeline 300 that supports acknowledgment feedback for semi-persistent scheduling in wireless communications in accordance with aspects of the present disclosure. In some examples, feedback timeline 300 may implement aspects of wireless communications system 100 or 200. While in this illustrated example a number of transmission slots 305 are illustrated, including a first transmission slot 305-*a* through a fifteenth transmission slot 305-*o* are illustrated, it is to be understood that aspects of the disclosure may be applicable to various slot configurations. In some cases, transmissions using transmission slots 305 may use licensed spectrum, unlicensed spectrum, or combinations thereof.

In this example, a UE may be configured with an SPS configuration, such as through RRC signaling. In some cases, multiple SPS configurations may be provided to the UE, including two or more SPS configurations that are associated with a same PUCCH group. A first DCI 310 may be transmitted in the first slot 305-*a*, that may include an activation indication for the SPS configuration at the UE. Further, the first DCI 310 may include a non-numeric feedback timing (e.g., a value of K1 indicates a non-numeric feedback timeline). Upon receiving the first DCI 310, the UE may begin monitoring PDSCH resources in accordance with the activated SPS configuration to receive PDSCH transmissions. In this example, a first SPS transmission 315 may be transmitted in the second slot 305-*b*, and the SPS configuration may indicate an SPS periodicity of four slots. Thus, the UE may monitor for a second SPS 320 in a sixth slot 305-*f*, a third SPS 335 in a tenth slot 305-*j*, a fourth an SPS 360 in a fourteenth slot 305-*n*, and so on. For each SPS 315, 320, 335, and 360, the UE may generate a HARQ ACK/NACK feedback indication based on whether the corresponding transmission was successfully received and decoded.

In this example, another DCI 325 may be transmitted by the base station and received at the UE that schedules a regular PDSCH 330 in eighth slot 305-*h*, with the regular PDSCH 330 being separate from the SPS configuration. In this example, the DCI 325 may indicate a non-numeric value for K1, and may provide a downlink assignment indicator (DAI) value of DAI=1 (e.g., that indicates the DAI is for an initial acknowledgment feedback indicator to be included in an acknowledgment codebook). In some cases, the DCI 325 may include one or more other parameters related to feedback, such as, for example, a new data indicator (NDI), a downlink transmission group of the PDSCH 330, a new acknowledgment feedback indicator (NFI) (e.g., that may operate as a toggle bit that, when toggled, indicates the DAI for the downlink transmission group is to be reset), and the like. The UE may attempt to receive and decode PDSCH 330 based on the DCI 325, and generate a HARQ ACK/NACK feedback indication based on whether the PDSCH 330 was successfully received and decoded.

Further, in this example, the base station may transmit and the UE may receive a second DCI 340 that indicates a numeric feedback timeline, and that may also schedule another regular PDSCH 345 transmission in the eleventh slot 305-*k*. The second DCI 340 may indicate that K1=2, and a value of DAI=2 for the associated PDSCH 345 transmission, and may also indicate PUCCH resources for transmission of acknowledgment feedback from the UE. Based on the numeric feedback timing provided in the second DCI 340, the UE may determine that feedback for one or more prior SPS transmissions is to be provided according to the indicated feedback timing and resources. Based on the K1=2 value, the UE may format a feedback report for transmission in a PUCCH 350 transmission in the thirteenth slot 305-*m*.

The PUCCH 350 transmission may include a feedback codebook 355 that includes HARQ ACK/NACK bits for one or more of the SPS transmissions received prior to the PUCCH 350 as well as HARQ ACK/NACK bits for regular PDSCH transmissions of PDSCH 330 and PDSCH 345. In some cases, the UE may determine which SPS transmissions are to be reported in a feedback report based on a timing of the second DCI 340, a timing of the PUCCH 350 with the feedback report, a UE capability (e.g., an N1 processing capability of the UE), or combinations thereof. Several examples of UE determination of which SPS transmissions are to be included in a feedback report are discussed with reference to FIG. 4. In the example of FIG. 3, the feedback codebook 355 includes five bits, including two bits for PDSCH 330 and PDSCH 345, for the DAI=1 and DAI=2 indications, and three bits corresponding to the first SPS 315, second SPS 320, and third SPS 335. In this example, the SPS feedback bits are appended to the regular PDSCH feedback bits in a single codebook, although numerous other examples may have feedback formatted in other ways, such as separate sub-codebooks for regular PDSCH and SPS feedback, multiple codebooks that include feedback for two or more PDSCH groups, multiple codebooks that include feedback for SPS transmissions of multiple activated SPS configurations in a PUCCH group, multiplexing of feedback bits, or any combinations thereof. Several examples of feedback report information and formatting are discussed herein, with the understanding that such examples are provided for illustration and discussion purposes of various techniques provided herein, and are not intended to limit the scope of the present disclosure.

The second DCI 340, as discussed, that indicates the timing and resources for the HARQ ACK/NACK feedback codebook 355, in some cases, may be the first detected DCI after the first DCI 310 (the activation DCI) with a numeric K1 value. The second DCI 340 may be identified as providing the numeric K1 value to be used for SPS feedback based on, for example, its cyclic redundancy check (CRC) being scrambled by a cell radio network temporary identified (C-RNTI) of the UE (e.g., the DCI scheduling a regular (i.e., non-SPS) PDSCH), its CRC being scrambled by a configured scheduling RNTI (CS-RNTI) scheduling a retransmission of an SPS PDSCH (e.g., the NDI value in the second DCI is 1), its CRC being scrambled by CS-RNTI and updating the activation of the same SPS configuration or activating another SPS configuration, or any combinations thereof. In some cases, the maximum number of HARQ ACK/NACK bits for SPS PDSCH reception with non-numeric K1 that can be carried on PUCCH 350 may be a predetermined value. For example, the maximum number of feedback bits may be equal to the number of HARQ processes for the SPS configuration (e.g., the "nrofHARQ-Processes" configured as part of the SPS-Config). In such cases, if the PUCCH slot indicated by the second DCI 340 is such that the number of SPS PDSCHs is more than the number of HARQ processes for the SPS configuration (e.g., nrofHARQ-Processes), the feedback codebook 355 may include HARQ ACK/NACK bits only for the last nrof-HARQ-Processes SPS PDSCHs (e.g., since, for earlier SPS PDSCHs, the HARQ process IDs would already be reused, there is no need for reporting A/N).

In cases where there are multiple active SPS configurations, then for each configuration the maximum number of ACK/NACK bits to be reported in one PUCCH may be equal to nrofHARQ-Processes for that configuration. Further, for dynamic codebook (type 2 PDCCH), all HARQ ACK/NACK feedback for SPS PDSCHs with non-numeric K1 to be reported may be appended to the end of the codebook, although other formats may also be used. When there are multiple active SPS configuration in CCs in a PUCCH group, in some cases, the second DCI 340 indicating the timing and resource for HARQ feedback reporting of activated SPS configurations with non-numeric K1 may be identified per SPS configuration, in some examples. In other examples, the second DCI 340 may be identified per downlink CC, and may thus indicate timing and resources for HARQ feedback reporting for all SPS configurations in that CC. In other examples, the second DCI 340 may be identified for all of the activated SPS configurations with non-numeric K1 in that PUCCH group.

In some cases, the second DCI 340 that indicates the timing and resources for the HARQ feedback of the SPS PDSCH(s) with non-numeric K1 can be restricted to have one or more of the following properties, including having a same PRI value as the PM indicated in the first DCI 310 (the DCI activating the SPS), having a HARQ process ID that belongs to one of the HARQ process IDs configured for that SPS configuration, having a same PDSCH group (for group-based dynamic HARQ feedback) as the PDSCH group indicated in the first DCI 310, having a HARQ feedback timing indicated by the second DCI 340 and the SPS PDSCHs are within a threshold number of slots prior to the second DCI 340 or PUCCH 350 slot, or any combinations thereof. In some cases, the latest SPS transmission to be included in a HARQ feedback report may be determined based on one or more techniques such as discussed with reference to FIG. 4.

Figure 4:
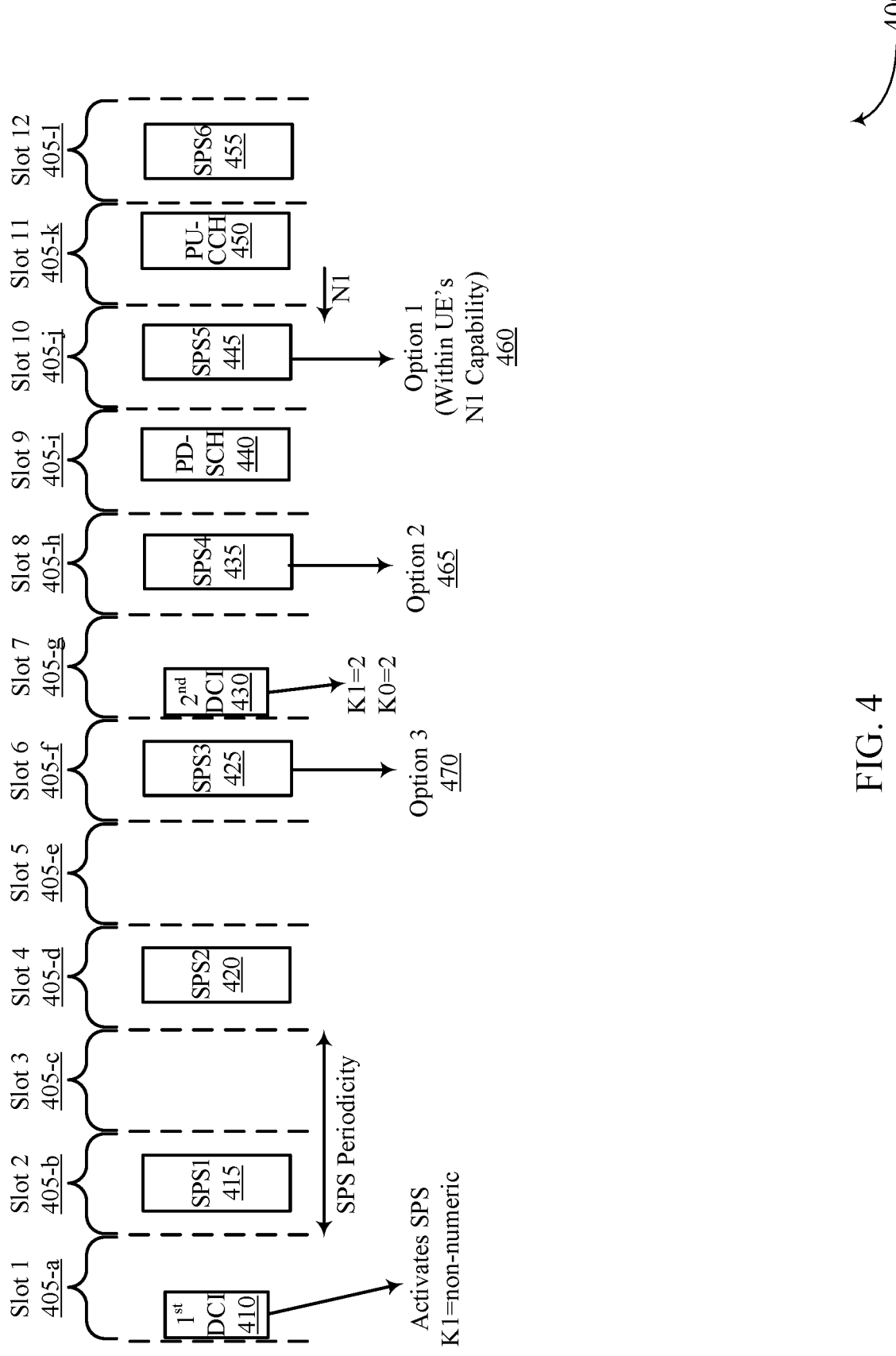

FIG. 4 illustrates an example of a feedback timeline 400 that supports acknowledgment feedback for semi-persistent scheduling in wireless communications in accordance with aspects of the present disclosure. In some examples, feedback timeline 400 may implement aspects of wireless communications system 100 or 200. In this example, a number of transmission slots 405 are illustrated, including a first transmission slot 405-*a* through a twelfth transmission slot 405-1. In some cases, transmissions using transmission slots 405 may use licensed spectrum, unlicensed spectrum, or combinations thereof.

In this example, similarly as in the example of FIG. 3, a UE may be configured with an SPS configuration, such as through RRC signaling. In some cases, multiple SPS configurations may be provided to a UE, including two or more SPS configurations that are associated with a same PUCCH group. A first DCI 410 may be transmitted in the first slot 405-*a*, that may include an activation indication for the SPS configuration at the UE. Further, the first DCI 410 may include a non-numeric feedback timing (e.g., a value of K1 indicates a non-numeric feedback timeline). Upon receiving the first DCI 410, the UE may begin monitoring PDSCH resources in accordance with the activated SPS configuration to receive PDSCH transmissions. In this example, a first SPS transmission 415 may be transmitted in the second slot 405-*b*, and the SPS configuration may indicate an SPS periodicity of two slots, and thus the UE may monitor for a second SPS 420 in a fourth slot 405-*d*, a third SPS 425 in a sixth slot 405-*f*, and so on. For each SPS transmission, the UE may generate a HARQ ACK/NACK feedback indication based on whether the corresponding transmission was successfully received and decoded.

In this example, a second DCI 430 may be received in the seventh slot 405-*g* and may indicate a value of K1=2. In this example, the second DCI 430 may also indicate a value of K0=2, which indicates that the scheduled PDSCH 440 is two slots after the second DCI 430, and also that feedback is to be transmitted K1 slots after the PDSCH 440, which corresponds to the eleventh slot 405-*k* in this example. The UE may determine which SPS transmissions are to be included with the acknowledgment feedback in PUCCH 450 transmission according to one of a number of options. In a first option 460, the UE may determine the latest SPS PDSCH among the multiple SPS PDSCHs for which their HARQ ACK/NACK is to be reported is determined as the latest SPS PDSCH is the last one before the PUCCH 450 and that is within the UE's N1 processing capability. In the example of FIG. 4, the UE's N1 processing capability may be one slot, and this the HARQ ACK/NACK feedback report in this case would include ACK/NACK bits for each of the first SPS 415, second SPS 420, third SPS 425, fourth SPS 435, and fifth SPS 445, as well as an ACK/NACK bit for PDSCH 440. In a second option 465, the latest SPS PDSCH is the last one before the PDSCH 440 that is scheduled by the second DCI 430 with a numeric K1 pointing to the same slot for HARQ feedback (e.g., last DCI can be the second DCI 430 or a subsequent DCI pointing to the same slot for HARQ feedback). Thus, for the second option 465 in the example of FIG. 4, the HARQ ACK/NACK feedback report in this case would include ACK/NACK bits for each of the first SPS 415, second SPS 420, third SPS 425, and fourth SPS 435, as well as an ACK/NACK bit for PDSCH 440. In a third option 470, the latest SPS PDSCH is the last one before the last DCI (second DCI 430 in the example of FIG. 4) with a numeric K1 pointing to the same slot for HARQ feedback. Thus, for the third option 470 in the example of FIG. 4, the HARQ ACK/NACK feedback report in this case would include ACK/NACK bits for each the first SPS 415, second SPS 420, and third SPS 425, as well as an ACK/NACK bit for PDSCH 440. In cases where there are multiple SPS configurations, the latest SPS PDSCH based on options 1-3 can be determined per SPS configuration or can be determined for all of the SPS configurations.

In some cases, when the second DCI 430 determines the timing and resources of the HARQ feedback for multiple SPS PDSCHs with non-numeric K1, the order of the ACK/NACK bits for the multiple SPS PDSCHs in the HARQ codebook may be determined based on a predetermined order. For example, the order of the ACK/NACK bits may be a same order as SPS PDSCH reception occasions. In other cases, the order may be according to the HARQ process ID of the SPS PDSCHs among the multiple SPS PDSCHs with pending ACK/NACK due to non-numeric K1.

In some cases, subsequent feedback reporting of SPS transmissions may also be determined based on the second DCI 430. In some cases, the K1 value for reporting HARQ feedback of the future SPS PDSCHs of the already activated SPS configuration may continue to be considered as non-numeric, and thus the UE may monitor for further subsequent DCIs that indicate feedback timing and resources (e.g., based on the SPS C-RNTI or CS-RNTI). In such cases, techniques as discussed with reference to FIGS. 3 and 4 may be repeated for subsequent SPS transmissions and DCI transmissions. In other cases, the K1 value of the second DCI 430 may be used for reporting HARQ feedback of future SPS PDSCHs of the already activated SPS configuration. In such cases, after the second DCI 430, the K1 value for that SPS configuration is no longer considered as non-numeric, and a one-bit ACK/NACK may be reported for SPS PDSCH per PUCCH according to the numeric feedback timeline. Further, in some cases, the second DCI 430 may provide an update to the activation of the same SPS configuration (e.g., its CRC is scrambled by CS-RNTI) with numeric K1, and then HARQ feedback for SPS PDSCH after that is reported according to the numeric timeline.

While the second DCI 430 is described as a downlink DCI that schedules a PDSCH transmission in various above examples, other types of DCI may also be used to provide timing and resources for acknowledgment feedback. For example, such a DCI may be an uplink DCI scheduling physical uplink shared channel (PUSCH), and in such cases HARQ feedback may be multiplexed on PUSCH (e.g., using an uplink control information (UCI) piggyback to include ACK/NACK on PUSCH), and the timing and resources are the same as PUSCH resources. In other examples, such a DCI may be a downlink DCI without scheduling PDSCH, in which case some combinations of the downlink DCI fields are used to indicate that no downlink data is scheduled, but K1 and PRI fields of the downlink DCI are used to indicate the timing and resources of PUCCH for HARQ feedback. In other examples, such a DCI may be a group-common DCI (GC-PDCCH), in which case timing and resources for HARQ feedback for pending ACK/NACK for multiple UEs are indicated by the group-common DCI.

In the event that the UE misses the second DCI 430 (e.g., the UE is not able to successfully receive and decode the second DCI 430), then the UE would not report HARQ feedback for the pending ACK/NACKs, and when there is a subsequent DCI indicating timing and resources for HARQ feedback for some new SPS PDSCHs, depending on whether or not the second DCI is missed, the number of ACK/NACK bits for SPS PDSCH(s) in the HARQ feedback scheduled by the third DCI can be different. In some cases, to solve this issue, the number of ACK/NACK bits to report for SPS with non-numeric K1 can be a set fixed value corresponding to the number of configured HARQ processes for an SPS configuration (e.g., nrofHARQ-Processes). In such cases, if the UE has already reported HARQ feedback for some of the SPS PDSCH(s) in a previous reporting, the UE can either set the corresponding bits to NACK, or repeat the ACK/NACK bits again for those SPS PDSCH(s).

Figure 5:
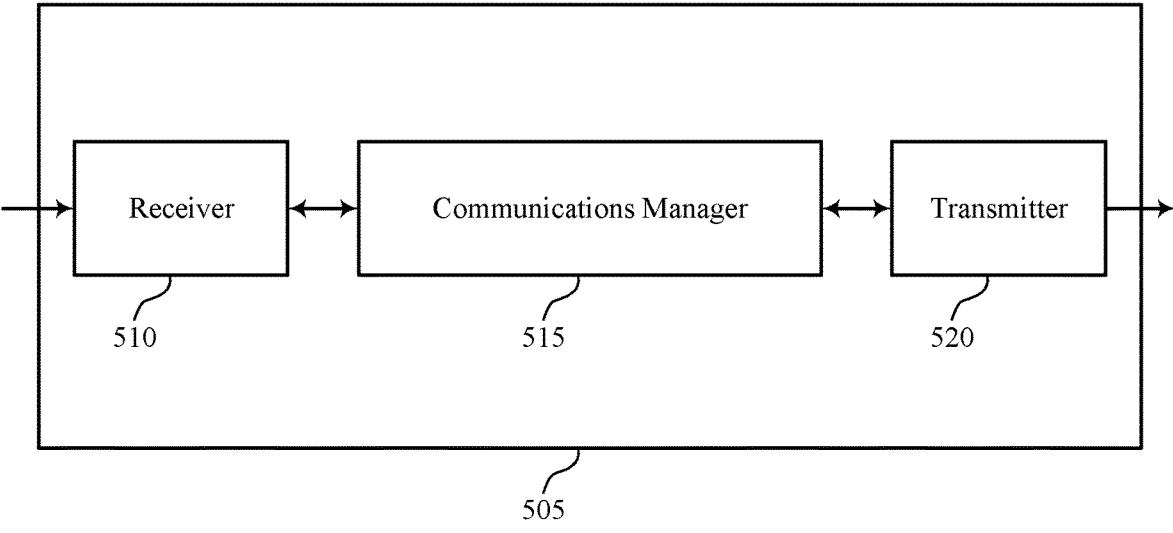
FIGS. 5 and 6 show block diagrams of devices that support acknowledgment feedback for semi-persistent scheduling in wireless communications in accordance with aspects of the present disclosure.

FIG. 5 shows a block diagram 500 of a device 505 that supports acknowledgment feedback for semi-persistent scheduling in wireless communications in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to acknowledgment feedback for semi-persistent scheduling in wireless communications, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions, receive, from the base station, a second downlink control information communication that indicates timing and resources for a first acknowledgment feedback for at least a first downlink semi-persistent scheduling transmission of the set of downlink semi-persistent scheduling transmissions, and transmit the first acknowledgment feedback based on the second downlink control information.

The communications manager 515 may also receive, from a base station, a first semi-persistent scheduling configuration that indicates resources for a set of downlink semi-persistent scheduling transmissions to the UE, receive, from the base station, a first downlink control information communication associated with the first semi-persistent scheduling configuration, where the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions, and identify the first downlink control information communication as an error case. The communications manager 515 may be an example of aspects of the communications manager 810 described herein.

The actions performed by the communications manager 515 as described herein may be implemented to realize one or more potential advantages. One implementation may allow a UE 115 to save uplink overhead by avoiding unnecessary uplink transmissions. Additionally or alternatively, the UE 115 may further reduce the extent in which it wakes up from idle periods to provide acknowledgment feedback when the SPS PDSCH is not transmitted. Another implementation may provide improved quality and reliability of service at the UE 115, as latency and the number of separate resources allocated to the UE 115 may be reduced.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
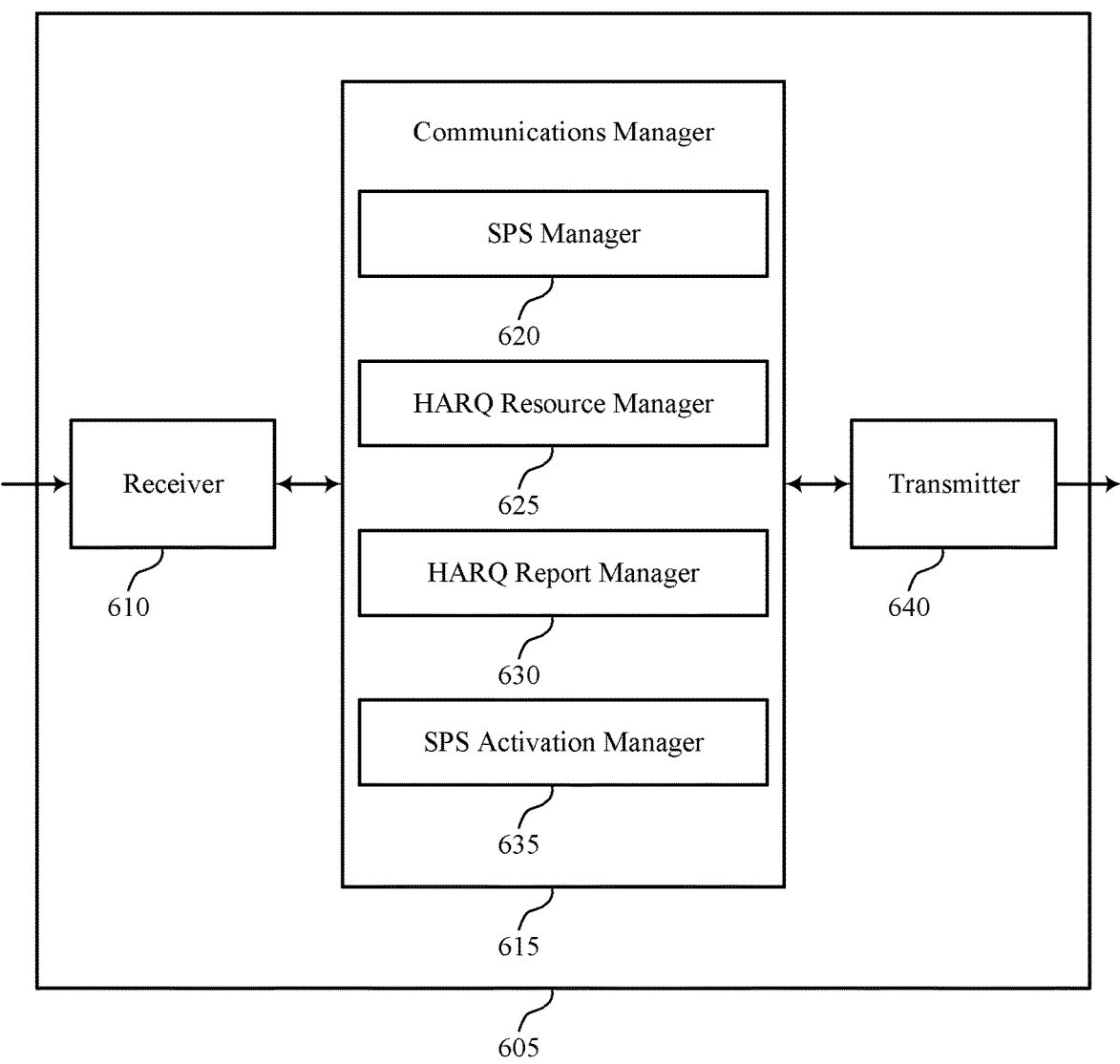

FIG. 6 shows a block diagram 600 of a device 605 that supports acknowledgment feedback for semi-persistent scheduling in wireless communications in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to acknowledgment feedback for semi-persistent scheduling in wireless communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an SPS manager 620, a HARQ resource manager 625, a HARQ report manager 630, and an SPS activation manager 635.

The communications manager 615 may be an example of aspects of the communications manager 810 described herein.

In some cases, the SPS manager 620 may receive, from a base station, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions. The HARQ resource manager 625 may receive, from the base station, a second downlink control information communication that indicates timing and resources for a first acknowledgment feedback for at least a first downlink semi-persistent scheduling transmission of the set of downlink semi-persistent scheduling transmissions. The HARQ report manager 630 may transmit the first acknowledgment feedback based on the second downlink control information.

In other cases, the SPS manager 620 may receive, from a base station, a first semi-persistent scheduling configuration that indicates resources for a set of downlink semi-persistent scheduling transmissions to the UE. The HARQ resource manager 625 may receive, from the base station, a first downlink control information communication associated with the first semi-persistent scheduling configuration, where the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions. The SPS activation manager 635 may identify the first downlink control information communication as an error case.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
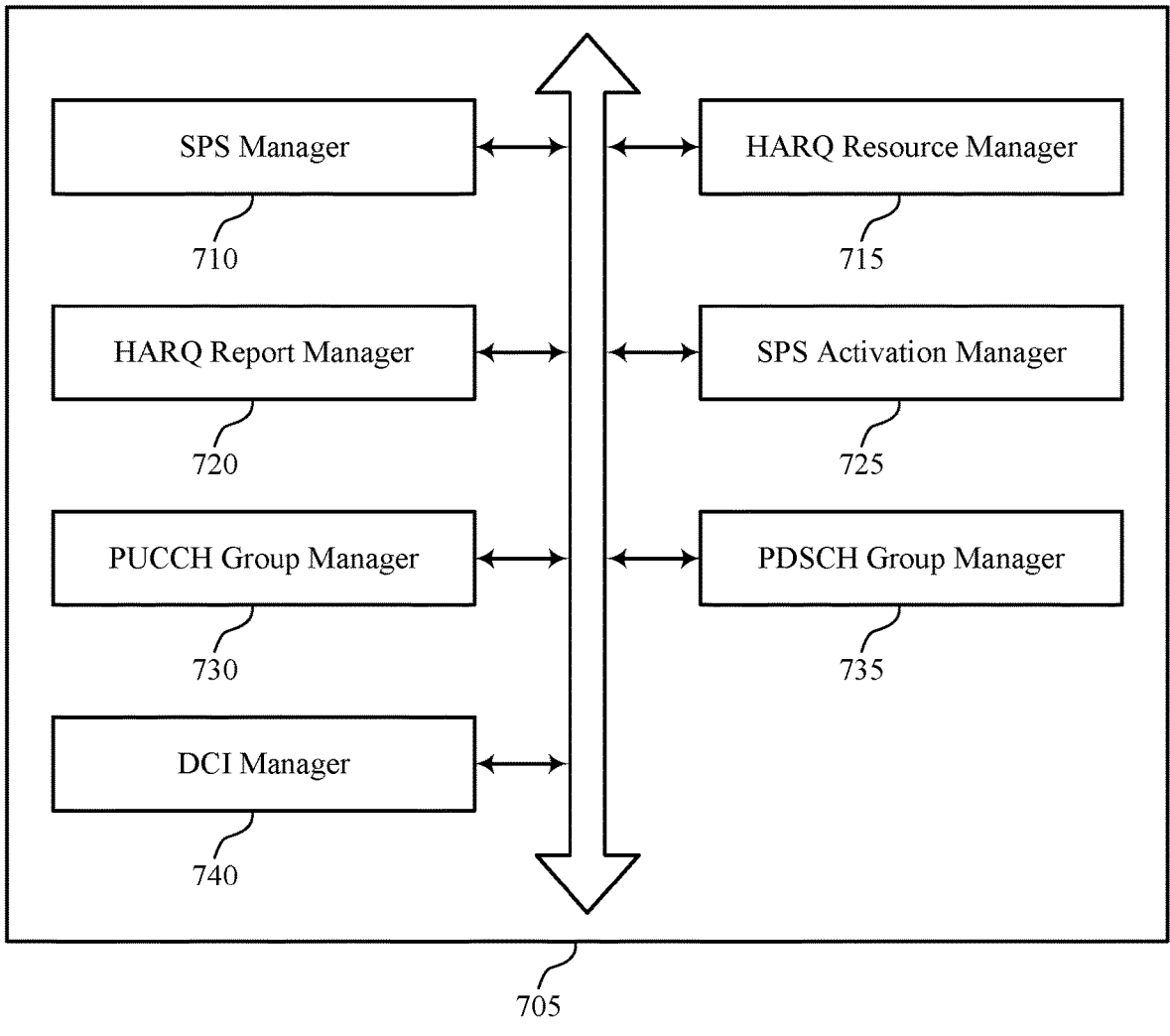
FIG. 7 shows a block diagram of a communications manager that supports acknowledgment feedback for semi-persistent scheduling in wireless communications in accordance with aspects of the present disclosure.

FIG. 7 shows a block diagram 700 of a communications manager 705 that supports acknowledgment feedback for semi-persistent scheduling in wireless communications in accordance with aspects of the present disclosure. The communications manager 705 may be an example of aspects of a communications manager 515, a communications manager 615, or a communications manager 810 described herein. The communications manager 705 may include an SPS manager 710, a HARQ resource manager 715, a HARQ report manager 720, an SPS activation manager 725, a PUCCH group manager 730, a PDSCH group manager 735, and a DCI manager 740. Each of these modules may communicate, directly or indirectly, with one another (e.g., via one or more buses).

The SPS manager 710 may receive, from a base station, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions.

The HARQ resource manager 715 may receive, from the base station, a second downlink control information communication that indicates timing and resources for a first acknowledgment feedback for at least a first downlink semi-persistent scheduling transmission of the set of downlink semi-persistent scheduling transmissions. In some examples, the HARQ resource manager 715 may detect a downlink control information communication after receiving the first downlink control information communication that includes an indication of uplink transmission resources for the first acknowledgment feedback. In some examples, the HARQ resource manager 715 may identify the second downlink control information communication based on an associated CRC that is scrambled by one or more of a cell radio network temporary identifier (C-RNTI) associated with the UE or a configured scheduling RNTI (CS-RNTI) associated with the UE.

In some examples, the HARQ resource manager 715 may determine that the second downlink control information communication indicates acknowledgment feedback timing and resources for one or more of the first semi-persistent scheduling configuration or a second semi-persistent scheduling configuration. In some examples, the HARQ resource manager 715 may determine that the second downlink control information communication indicates acknowledgment feedback timing and resources for the first semi-persistent scheduling configuration based on a physical uplink control channel resource indicator (PM) field of the second downlink control information communication matching the PM field of the first downlink control information communication.

In some cases, the second downlink control information communication schedules a downlink shared channel transmission separate from the first semi-persistent scheduling configuration, schedules a retransmission of a previously transmitted semi-persistent scheduling configuration transmission, provides an activation update to the first semi-persistent scheduling configuration, activates a different semi-persistent scheduling configuration, or any combinations thereof.

In some cases, the second downlink control information communication includes an explicit indication of which of the first semi-persistent scheduling configuration, the second semi-persistent scheduling configuration, one or more other semi-persistent scheduling configurations, or combinations thereof, are to provide acknowledgment feedback using the indicated acknowledgement feedback timing and resources.

In some cases, each semi-persistent scheduling configuration is associated with a component carrier of two or more component carriers, and where which of one or more of the first semi-persistent scheduling configuration or the second semi-persistent scheduling configuration are to provide feedback information using the indicated acknowledgement feedback timing and resources is determined based on the component carrier used to communicate the second downlink control information communication.

In some cases, the second downlink control information is determined to provide the timing and resources for the first acknowledgment feedback when one or more hybrid acknowledgment repeat request (HARQ) process IDs indicated in the second downlink control information correspond to one or more HARQ process IDs configured for the first semi-persistent scheduling configuration.

In some cases, the UE maintains the non-numeric relationship for timing between the acknowledgment feedback and the resources for the set of downlink semi-persistent scheduling transmissions after the transmitting. In some cases, a timing between subsequent semi-persistent scheduling transmissions and a subsequent corresponding acknowledgment feedback transmission is based on the indicated timing in the second downlink control information communication. In some cases, the second downlink control information communication provides an activation update for the first semi-persistent scheduling configuration with a numeric relationship for timing between the subsequent acknowledgment feedback and the resources for the subsequent semi-persistent scheduling transmissions.

In some cases, the second downlink control information communication does not schedule an associated downlink or uplink transmission. In some cases, the second downlink control information communication includes one or more fields that indicate the timing and resources for the acknowledgment feedback, and one or more fields that indicate a downlink or uplink data transmission is not scheduled by the second downlink control information communication.

The HARQ report manager 720 may transmit the first acknowledgment feedback based on the second downlink control information.

In some examples, the HARQ report manager 720 may determine that a number of semi-persistent scheduling transmissions that have acknowledgement feedback information to be reported in the first acknowledgment feedback exceeds the maximum number of feedback bits. In some examples, the HARQ report manager 720 may format the first acknowledgment feedback to include feedback information for a latest number of semi-persistent scheduling transmissions that can be reported using the maximum number of bits.

In some examples, the HARQ report manager 720 may determine a latest semi-persistent scheduling transmission of the set of semi-persistent scheduling transmissions for which acknowledgment feedback is to be provided in the first acknowledgment feedback based on the second downlink control information. In some examples, the HARQ report manager 720 may determine a last semi-persistent scheduling transmission of the set of semi-persistent scheduling transmissions that has been received at the UE prior to a UE processing timeline for reporting acknowledgment feedback. In some examples, the HARQ report manager 720 may determine a last semi-persistent scheduling transmission of the set of semi-persistent scheduling transmissions that has been received at the UE prior to receiving the second downlink control information communication. In some examples, the HARQ report manager 720 may determine a last semi-persistent scheduling transmission of the set of semi-persistent scheduling transmissions that has been received at the UE at a latest semi-persistent scheduling transmission prior to a downlink shared channel transmission that is scheduled by the second downlink control information communication.

In some cases, a maximum number of feedback bits associated with one or more downlink semi-persistent scheduling transmissions of the plurality of downlink semi-persistent scheduling transmissions to be included in the first acknowledgment feedback corresponds to a number of hybrid acknowledgment repeat request (HARQ) processes configured in the first semi-persistent scheduling configuration.

In some cases, the first acknowledgment feedback includes two or more bits corresponding to two or more semi-persistent scheduling transmissions, and is appended to a dynamic feedback codebook associated with at least a first regular downlink transmission to the UE. In some cases, the first acknowledgment feedback includes information for one or more semi-persistent scheduling transmissions that are within a threshold number of slots prior to the resources for acknowledgment feedback that are indicated by the second downlink control information communication. In some cases, the latest semi-persistent scheduling transmission is determined per semi-persistent scheduling configuration when multiple semi-persistent scheduling configurations are active or is determined across multiple active semi-persistent scheduling configurations.

In some cases, an order of feedback bits of the acknowledgment feedback is determined based on a predetermined rule set. In some cases, the order of feedback bits of the acknowledgment feedback corresponds to an order in which each corresponding semi-persistent scheduling transmission is received at the UE. In some cases, the order of feedback bits of the acknowledgment feedback corresponds to an order of hybrid acknowledgment repeat request (HARQ) process IDs associated with each semi-persistent scheduling transmission for which acknowledgment feedback is provided. In some cases, the second downlink control information communication provides uplink scheduling information for one or more uplink communications from the UE, and where the first acknowledgment feedback is multiplexed with one or more of the uplink communications from the UE.

In some cases, the first acknowledgment feedback includes a first number of feedback bits that correspond to a configured number of hybrid acknowledgment repeat request (HARQ) processes indicated in the first semi-persistent scheduling configuration. In some cases, the first acknowledgment feedback includes feedback information for a second number of semi-persistent scheduling transmissions that is fewer than the first number of feedback bits, and the UE reports a negative acknowledgment or a previous value for each feedback bit of the first number of feedback bits that does not have an associated semi-persistent scheduling transmission in the second number of semi-persistent scheduling transmissions.

In some examples, the SPS activation manager 725 may receive an activation indication for at least a second semi-persistent scheduling configuration, and where a maximum number of feedback bits for each of the first semi-persistent scheduling configuration and the second semi-persistent scheduling configuration is provided as part of the respective first semi-persistent scheduling configuration and second semi-persistent scheduling configuration.

The SPS activation manager 725, in some cases, may identify the first downlink control information communication as an error case. In some cases, the SPS activation manager 725 may ignore the first downlink control information communication based on the error case identification. In some cases, the first semi-persistent scheduling configuration indicates that acknowledgment feedback associated with the plurality of downlink semi-persistent scheduling transmissions provided in feedback transmissions having a non-numeric relationship with the resources for the plurality of downlink semi-persistent scheduling transmissions is prohibited. In some cases, identifying the error case is based on the indication that the indication that acknowledgement feedback provided in feedback transmissions having a non-numeric relationship with the resources for the plurality of downlink semi-persistent scheduling transmissions is prohibited.

The PUCCH group manager 730 may determine that the first semi-persistent scheduling configuration and a second semi-persistent scheduling configuration are in the same PUCCH group. In some examples, the second downlink control information communication indicates timing and resources for the first acknowledgment feedback that includes feedback information downlink semi-persistent scheduling transmissions of the plurality of downlink semi-persistent scheduling transmissions corresponding to the first semi-persistent scheduling configuration and the second semi-persistent scheduling configuration based on the determining.

The PDSCH group manager 735 may identify a PDSCH group associated with one or more SPS configurations. In some cases, the first semi-persistent scheduling configuration is associated with a first downlink transmission group. In some cases, the second downlink control information communication is associated a same downlink transmission group as the first downlink control information communication.

The DCI manager 740 may determine that a DCI provides feedback resources and timing information for non-numeric feedback timelines. In some cases, the downlink control information communication is a group common downlink control information communication. In some cases, the group common downlink control information communication indicates the timing and resources for acknowledgment feedback for multiple UEs.

Figure 8:
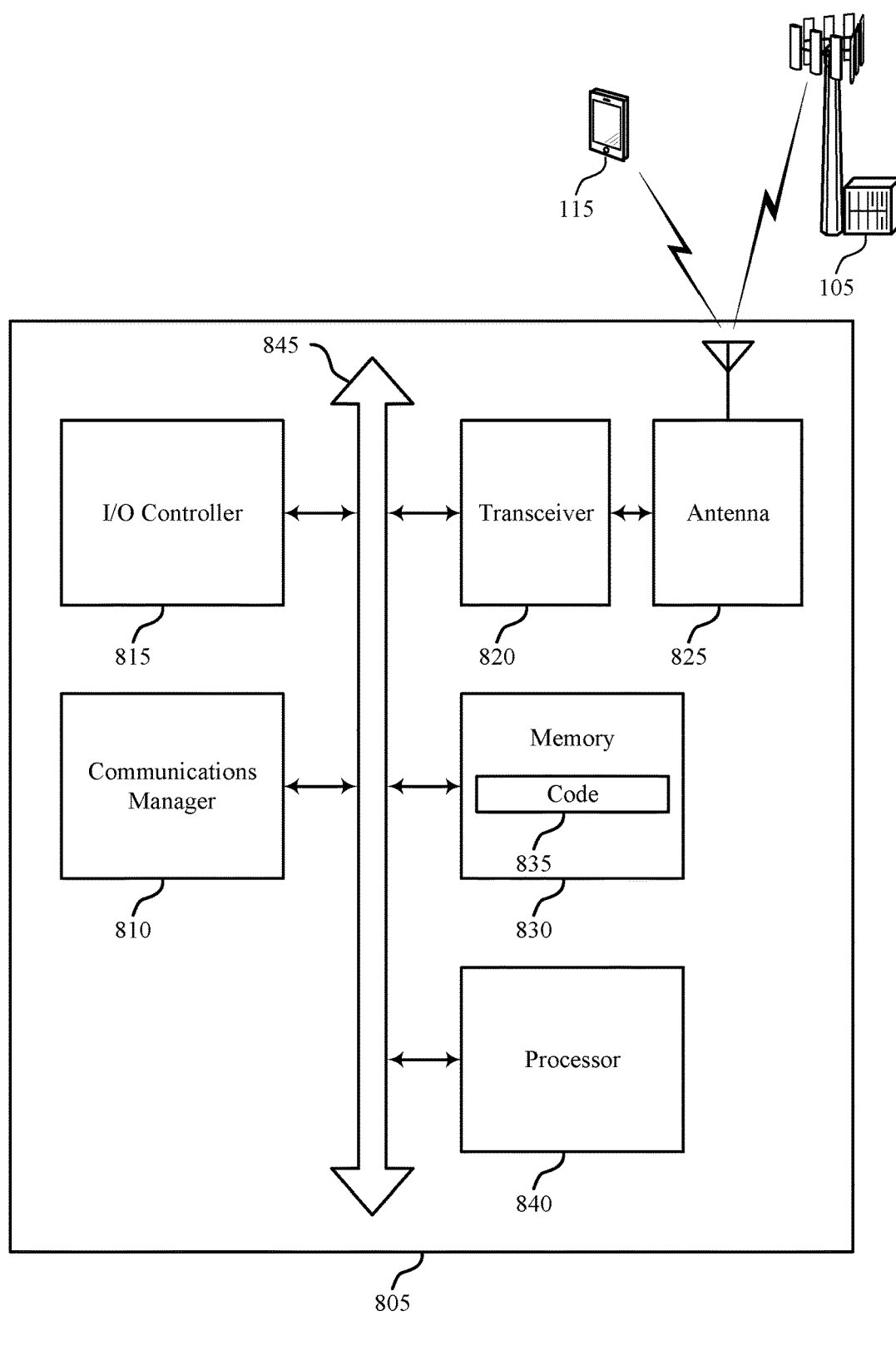
FIG. 8 shows a diagram of a system including a device that supports acknowledgment feedback for semi-persistent scheduling in wireless communications in accordance with aspects of the present disclosure.

FIG. 8 shows a diagram of a system 800 including a device 805 that supports acknowledgment feedback for semi-persistent scheduling in wireless communications in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions, receive, from the base station, a second downlink control information communication that indicates timing and resources for a first acknowledgment feedback for at least a first downlink semi-persistent scheduling transmission of the set of downlink semi-persistent scheduling transmissions, and transmit the first acknowledgment feedback based on the second downlink control information.

The communications manager 810 may also receive, from a base station, a first semi-persistent scheduling configuration that indicates resources for a set of downlink semi-persistent scheduling transmissions to the UE, receive, from the base station, a first downlink control information communication associated with the first semi-persistent scheduling configuration, where the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions, and identify the first downlink control information communication as an error case.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting acknowledgment feedback for semi-persistent scheduling in wireless communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The actions performed by the processor 840, memory 830, I/O controller 815, communications manager 810, transceiver 820, and antenna 825 as described herein may be implemented to realize one or more potential advantages. One implementation may allow the device 805 to save power and increase battery life by avoiding unnecessary uplink transmission to provide acknowledgment feedback when the SPS PDSCH is not transmitted. Another implementation may provide improved data throughput and user experience at the device 805 through the reduction of signaling overhead.

Figure 9:
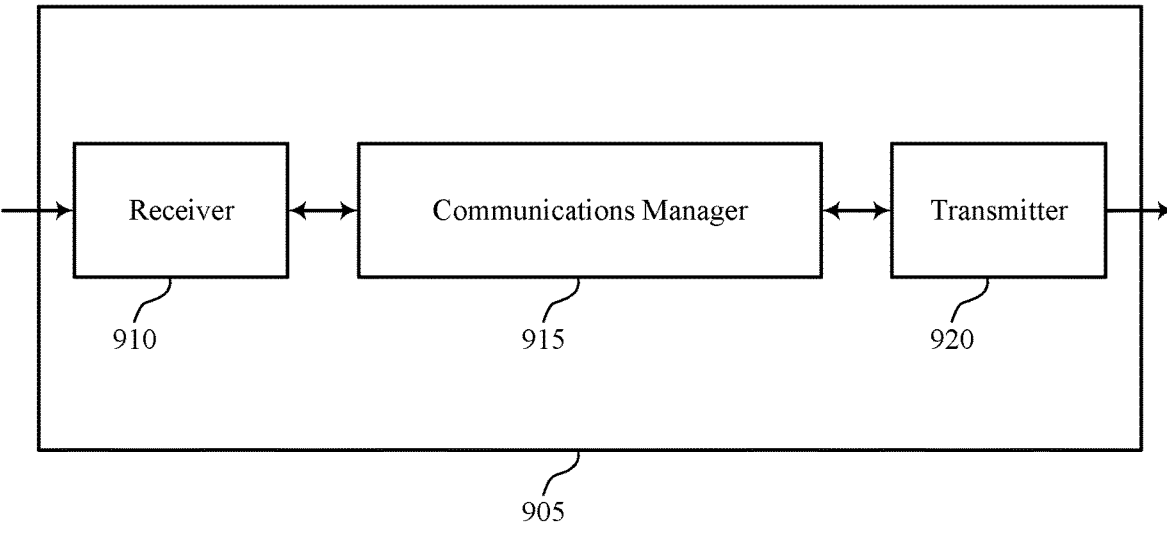
FIGS. 9 and 10 show block diagrams of devices that support acknowledgment feedback for semi-persistent scheduling in wireless communications in accordance with aspects of the present disclosure.

FIG. 9 shows a block diagram 900 of a device 905 that supports acknowledgment feedback for semi-persistent scheduling in wireless communications in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to acknowledgment feedback for semi-persistent scheduling in wireless communications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions, transmit, to the UE, a second downlink control information communication that indicates timing and resources for a first acknowledgment feedback for at least a first downlink semi-persistent scheduling transmission of the set of downlink semi-persistent scheduling transmissions, and receive, from the UE, the first acknowledgment feedback based on the second downlink control information. The communications manager 915 may be an example of aspects of the communications manager 1210 described herein.

The actions performed by the communications manager 915 as described herein may be implemented to realize one or more potential advantages. One implementation may allow a base station 105 to save power and increase battery life by increasing scheduling flexibility. Additionally or alternatively, the base station 105 may further enhance efficiency as the base station 105 may have flexibility to trigger acknowledgment feedback at a later time. Another implementation may provide improved quality and reliability of service at the base station 105, as latency may be reduced.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
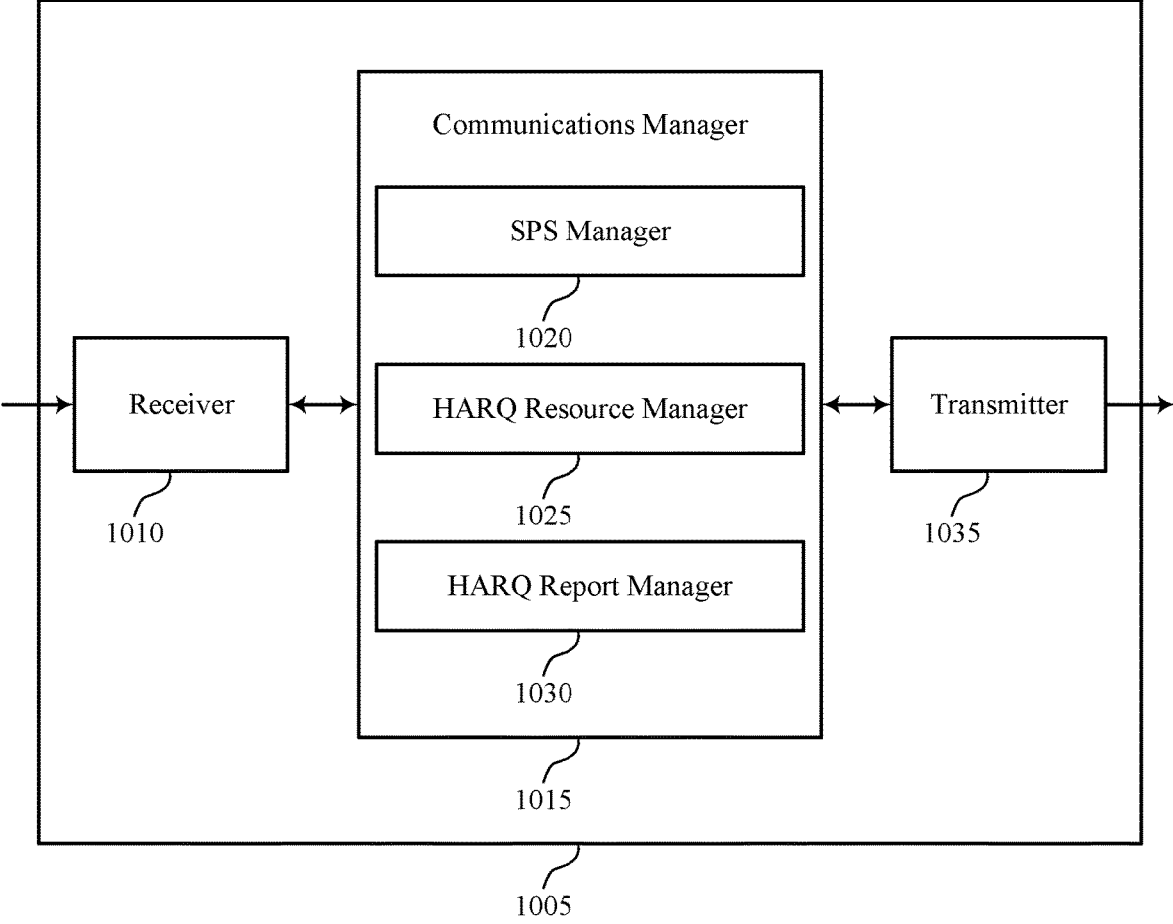

FIG. 10 shows a block diagram 1000 of a device 1005 that supports acknowledgment feedback for semi-persistent scheduling in wireless communications in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to acknowledgment feedback for semi-persistent scheduling in wireless communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an SPS manager 1020, a HARQ resource manager 1025, and a HARQ report manager 1030. The communications manager 1015 may be an example of aspects of the communications manager 1210 described herein.

The SPS manager 1020 may transmit, to a UE, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions.

The HARQ resource manager 1025 may transmit, to the UE, a second downlink control information communication that indicates timing and resources for a first acknowledgment feedback for at least a first downlink semi-persistent scheduling transmission of the set of downlink semi-persistent scheduling transmissions.

The HARQ report manager 1030 may receive, from the UE, the first acknowledgment feedback based on the second downlink control information.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
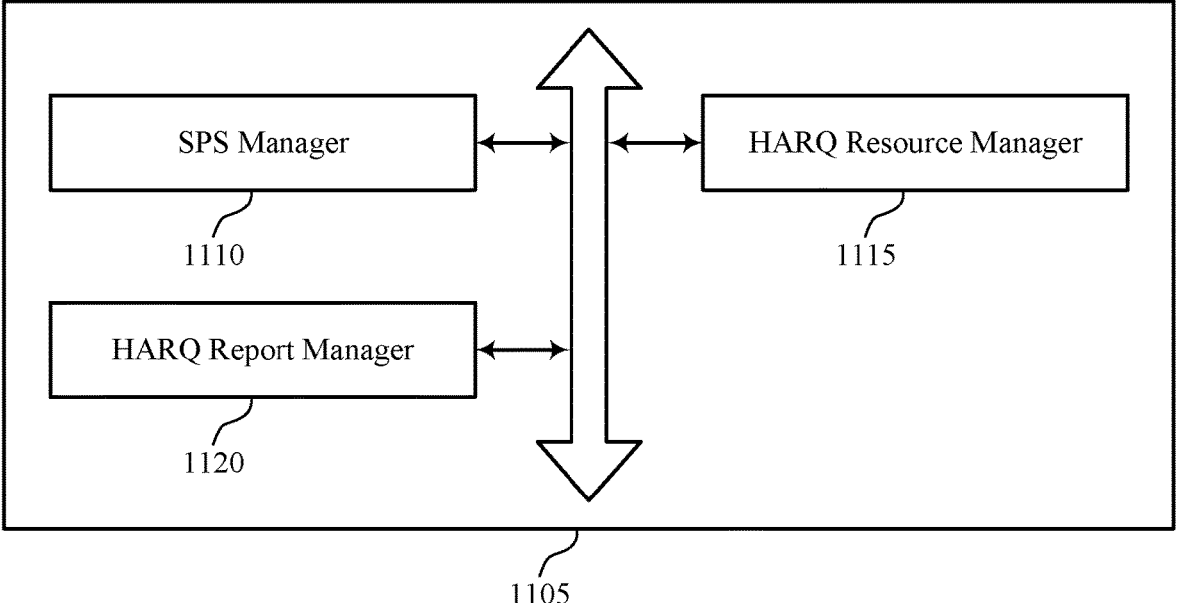
FIG. 11 shows a block diagram of a communications manager that supports acknowledgment feedback for semi-persistent scheduling in wireless communications in accordance with aspects of the present disclosure.

FIG. 11 shows a block diagram 1100 of a communications manager 1105 that supports acknowledgment feedback for semi-persistent scheduling in wireless communications in accordance with aspects of the present disclosure. The communications manager 1105 may be an example of aspects of a communications manager 915, a communications manager 1015, or a communications manager 1210 described herein. The communications manager 1105 may include an SPS manager 1110, a HARQ resource manager 1115, and a HARQ report manager 1120. Each of these modules may communicate, directly or indirectly, with one another (e.g., via one or more buses).

The SPS manager 1110 may transmit, to a UE, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions.

The HARQ resource manager 1115 may transmit, to the UE, a second downlink control information communication that indicates timing and resources for a first acknowledgment feedback for at least a first downlink semi-persistent scheduling transmission of the set of downlink semi-persistent scheduling transmissions.

In some cases, the second downlink control information communication is transmitted after the first downlink control information communication that includes an indication of uplink transmission resources for the first acknowledgment feedback. In some cases, the second downlink control information communication schedules a downlink shared channel transmission separate from the first semi-persistent scheduling configuration, schedules a retransmission of a previously transmitted semi-persistent scheduling configuration transmission, provides an activation update to the first semi-persistent scheduling configuration, activates a different semi-persistent scheduling configuration, or any combinations thereof. In some cases, the second downlink control information communication is identified based on an associated CRC that is scrambled by one or more of a cell radio network temporary identifier (C-RNTI) associated with the UE or a configured scheduling RNTI (CS-RNTI) associated with the UE.

The HARQ report manager 1120 may receive, from the UE, the first acknowledgment feedback based on the second downlink control information.

Figure 12:
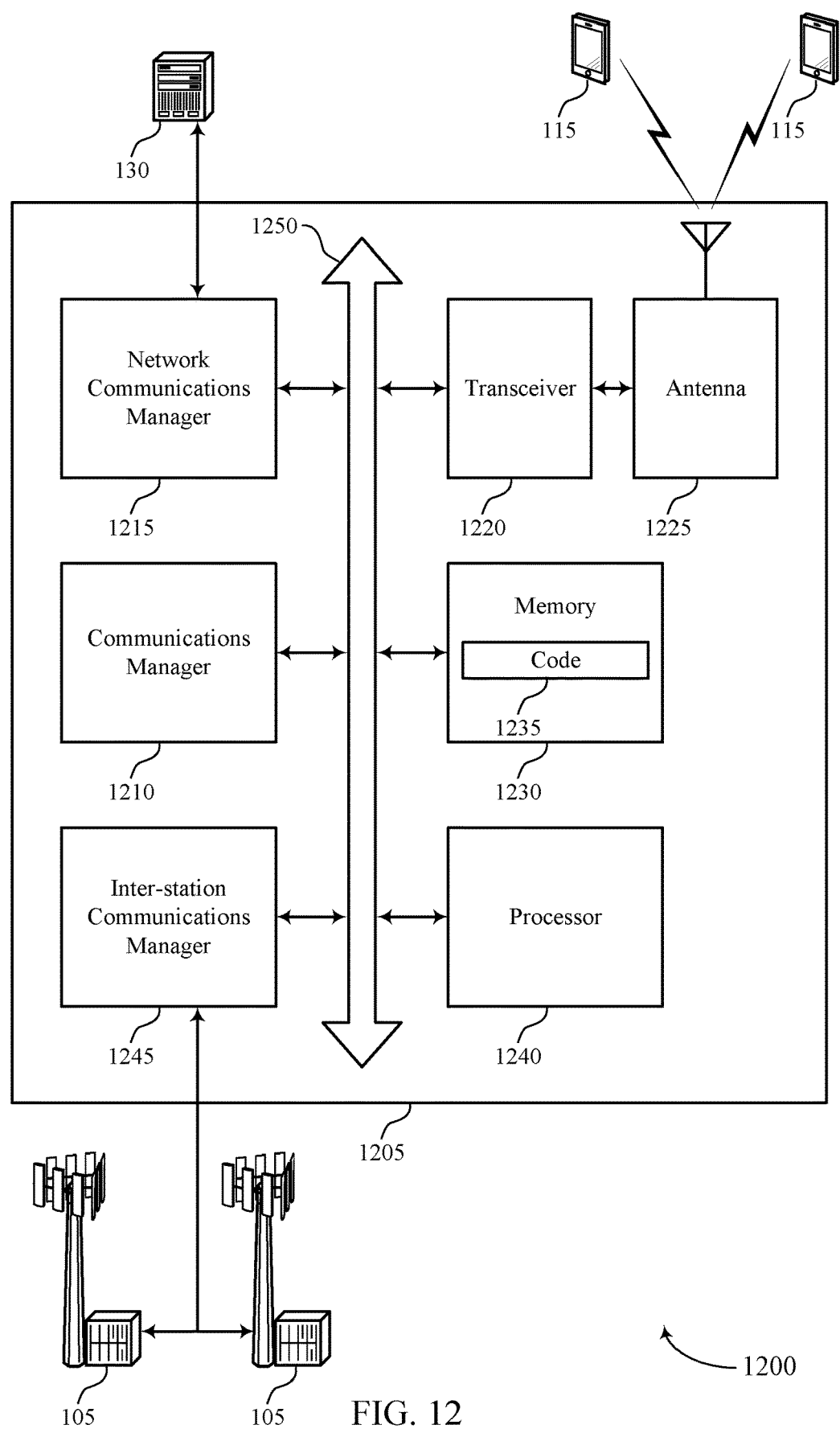
FIG. 12 shows a diagram of a system including a device that supports acknowledgment feedback for semi-persistent scheduling in wireless communications in accordance with aspects of the present disclosure.

FIG. 12 shows a diagram of a system 1200 including a device 1205 that supports acknowledgment feedback for semi-persistent scheduling in wireless communications in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions, transmit, to the UE, a second downlink control information communication that indicates timing and resources for a first acknowledgment feedback for at least a first downlink semi-persistent scheduling transmission of the set of downlink semi-persistent scheduling transmissions, and receive, from the UE, the first acknowledgment feedback based on the second downlink control information.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting acknowledgment feedback for semi-persistent scheduling in wireless communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The actions performed by the processor 1240, memory 1230, network communications manager 1215, communications manager 1210, transceiver 1220, the inter-station communications manager 1245, and antenna 1225 as described herein may be implemented to realize one or more potential advantages. One implementation may allow the device 1205 to save power and increase battery life through enhanced scheduling flexibility. Another implementation may provide improved data throughput and higher reliability at the device 1205 through the reduction of signaling overhead.

FIG. 13 shows a flowchart illustrating a method 1300 that supports acknowledgment feedback for semi-persistent scheduling in wireless communications in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a base station, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions. The operations of 1305 may be performed according to the methods described herein. In some examples, aspects of the operations of 1305 may be performed by an SPS manager as described with reference to FIGS. 5 through 8.

At 1310, the UE may receive, from the base station, a second downlink control information communication that indicates timing and resources for a first acknowledgment feedback for at least a first downlink semi-persistent scheduling transmission of the set of downlink semi-persistent scheduling transmissions. The operations of 1310 may be performed according to the methods described herein. In some examples, aspects of the operations of 1310 may be performed by a HARQ resource manager as described with reference to FIGS. 5 through 8.

At 1315, the UE may transmit the first acknowledgment feedback based on the second downlink control information. The operations of 1315 may be performed according to the methods described herein. In some examples, aspects of the operations of 1315 may be performed by a HARQ report manager as described with reference to FIGS. 5 through 8.

FIG. 14 shows a flowchart illustrating a method 1400 that supports acknowledgment feedback for semi-persistent scheduling in wireless communications in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions. The operations of 1405 may be performed according to the methods described herein. In some examples, aspects of the operations of 1405 may be performed by an SPS manager as described with reference to FIGS. 5 through 8.

At 1410, the UE may receive, from the base station, a second downlink control information communication that indicates timing and resources for a first acknowledgment feedback for at least a first downlink semi-persistent scheduling transmission of the set of downlink semi-persistent scheduling transmissions. The operations of 1410 may be performed according to the methods described herein. In some examples, aspects of the operations of 1410 may be performed by a HARQ resource manager as described with reference to FIGS. 5 through 8.

At 1415, the UE may determine that a number of semi-persistent scheduling transmissions that have acknowledgment feedback information to be reported in the first acknowledgment feedback exceeds a maximum number of feedback bits, where the maximum number of feedback corresponds to a number of HARQ processes configured in the first semi-persistent scheduling configuration. The operations of 1415 may be performed according to the methods described herein. In some examples, aspects of the operations of 1415 may be performed by a HARQ report manager as described with reference to FIGS. 5 through 8.

At 1420, the UE may format the first acknowledgment feedback to include feedback information for a latest number of semi-persistent scheduling transmissions that can be reported using the maximum number of bits. The operations of 1420 may be performed according to the methods described herein. In some examples, aspects of the operations of 1420 may be performed by a HARQ report manager as described with reference to FIGS. 5 through 8.

At 1425, the UE may transmit the first acknowledgment feedback. The operations of 1425 may be performed according to the methods described herein. In some examples, aspects of the operations of 1425 may be performed by a HARQ report manager as described with reference to FIGS. 5 through 8.

FIG. 15 shows a flowchart illustrating a method 1500 that supports acknowledgment feedback for semi-persistent scheduling in wireless communications in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions. The operations of 1505 may be performed according to the methods described herein. In some examples, aspects of the operations of 1505 may be performed by an SPS manager as described with reference to FIGS. 5 through 8.

At 1510, the UE may receive an activation for at least a second semi-persistent scheduling configuration. The operations of 1510 may be performed according to the methods described herein. In some examples, aspects of the operations of 1510 may be performed by an SPS activation manager as described with reference to FIGS. 5 through 8.

At 1515, the UE may receive, from the base station, a second downlink control information communication that indicates timing and resources for a first acknowledgment feedback for at least a first downlink semi-persistent scheduling transmission of the set of downlink semi-persistent scheduling transmissions. The operations of 1515 may be performed according to the methods described herein. In some examples, aspects of the operations of 1515 may be performed by a HARQ resource manager as described with reference to FIGS. 5 through 8.

At 1520, the UE may determine that the second downlink control information communication indicates acknowledgment feedback timing and resources for one or more of the first semi-persistent scheduling configuration or the second semi-persistent scheduling configuration. The operations of 1520 may be performed according to the methods described herein. In some examples, aspects of the operations of 1520 may be performed by a HARQ resource manager as described with reference to FIGS. 5 through 8.

At 1525, the UE may transmit at least the first acknowledgment feedback based on the second downlink control information. The operations of 1525 may be performed according to the methods described herein. In some examples, aspects of the operations of 1525 may be performed by a HARQ report manager as described with reference to FIGS. 5 through 8.

FIG. 16 shows a flowchart illustrating a method 1600 that supports acknowledgment feedback for semi-persistent scheduling in wireless communications in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions. The operations of 1605 may be performed according to the methods described herein. In some examples, aspects of the operations of 1605 may be performed by an SPS manager as described with reference to FIGS. 5 through 8.

At 1610, the UE may receive, from the base station, a second downlink control information communication. The operations of 1610 may be performed according to the methods described herein. In some examples, aspects of the operations of 1610 may be performed by a HARQ resource manager as described with reference to FIGS. 5 through 8.

At 1615, the UE may determine that the second downlink control information communication indicates acknowledgment feedback timing and resources for the first semi-persistent scheduling configuration based on a physical uplink control channel resource indicator (PM) field of the second downlink control information communication matching the PM field of the first downlink control information communication. The operations of 1615 may be performed according to the methods described herein. In some examples, aspects of the operations of 1615 may be performed by a HARQ resource manager as described with reference to FIGS. 5 through 8.

At 1620, the UE may transmit the first acknowledgment feedback based on the second downlink control information. The operations of 1620 may be performed according to the methods described herein. In some examples, aspects of the operations of 1620 may be performed by a HARQ report manager as described with reference to FIGS. 5 through 8.

FIG. 17 shows a flowchart illustrating a method 1700 that supports acknowledgment feedback for semi-persistent scheduling in wireless communications in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1705, the UE may receive, from a base station, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions. The operations of 1705 may be performed according to the methods described herein. In some examples, aspects of the operations of 1705 may be performed by an SPS manager as described with reference to FIGS. 5 through 8.

At 1710, the UE may receive, from the base station, a second downlink control information communication that indicates timing and resources for a first acknowledgment feedback for at least a first downlink semi-persistent scheduling transmission of the set of downlink semi-persistent scheduling transmissions. The operations of 1710 may be performed according to the methods described herein. In some examples, aspects of the operations of 1710 may be performed by a HARQ resource manager as described with reference to FIGS. 5 through 8.

At 1715, the UE may determine a latest semi-persistent scheduling transmission of the set of semi-persistent scheduling transmissions for which acknowledgment feedback is to be provided in the first acknowledgment feedback based on the second downlink control information. The operations of 1715 may be performed according to the methods described herein. In some examples, aspects of the operations of 1715 may be performed by a HARQ report manager as described with reference to FIGS. 5 through 8.

At 1720, the UE may transmit the first acknowledgment feedback based on the second downlink control information. The operations of 1720 may be performed according to the methods described herein. In some examples, aspects of the operations of 1720 may be performed by a HARQ report manager as described with reference to FIGS. 5 through 8.

FIG. 18 shows a flowchart illustrating a method 1800 that supports acknowledgment feedback for semi-persistent scheduling in wireless communications in accordance with aspects of the present disclosure. The operations of method 1800 may be implemented by a UE 115 or its components as described herein. For example, the operations of method 1800 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1805, the UE may receive, from a base station, a first semi-persistent scheduling configuration that indicates resources for a set of downlink semi-persistent scheduling transmissions to the UE. The operations of 1805 may be performed according to the methods described herein. In some examples, aspects of the operations of 1805 may be performed by an SPS manager as described with reference to FIGS. 5 through 8.

At 1810, the UE may receive, from the base station, a first downlink control information communication associated with the first semi-persistent scheduling configuration, where the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions. The operations of 1810 may be performed according to the methods described herein. In some examples, aspects of the operations of 1810 may be performed by a HARQ resource manager as described with reference to FIGS. 5 through 8.

At 1815, the UE may identify the first downlink control information communication as an error case. The operations of 1815 may be performed according to the methods described herein. In some examples, aspects of the operations of 1815 may be performed by an SPS activation manager as described with reference to FIGS. 5 through 8.

FIG. 19 shows a flowchart illustrating a method 1900 that supports acknowledgment feedback for semi-persistent scheduling in wireless communications in accordance with aspects of the present disclosure. The operations of method 1900 may be implemented by a base station 105 or its components as described herein. For example, the operations of method 1900 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1905, the base station may transmit, to a UE, a first downlink control information communication that activates a first semi-persistent scheduling configuration, where the first semi-persistent scheduling configuration indicates resources for a set of downlink semi-persistent scheduling transmissions to the UE, and the first downlink control information communication indicates that acknowledgment feedback associated with the set of downlink semi-persistent scheduling transmissions is to be provided in feedback transmissions having a non-numeric relationship with the resources for the set of downlink semi-persistent scheduling transmissions. The operations of 1905 may be performed according to the methods described herein. In some examples, aspects of the operations of 1905 may be performed by an SPS manager as described with reference to FIGS. 9 through 12.

At 1910, the base station may transmit, to the UE, a second downlink control information communication that indicates timing and resources for a first acknowledgment feedback for at least a first downlink semi-persistent scheduling transmission of the set of downlink semi-persistent scheduling transmissions. The operations of 1910 may be performed according to the methods described herein. In some examples, aspects of the operations of 1910 may be performed by a HARQ resource manager as described with reference to FIGS. 9 through 12.

At 1915, the base station may receive, from the UE, the first acknowledgment feedback based on the second downlink control information. The operations of 1915 may be performed according to the methods described herein. In some examples, aspects of the operations of 1915 may be performed by a HARQ report manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE), comprising:
one or more processors;
one or more memories coupled with the one or more processors; and
one or more processor-readable instructions stored in the one or more memories and executable by the one or more processors individually or collectively to cause the UE to:
receive a first semi-persistent scheduling configuration that indicates resources for a plurality of downlink semi-persistent scheduling transmissions to the UE;

receive a first downlink control information communication associated with the first semi-persistent scheduling configuration, wherein the first downlink control information communication comprises an indication of a relationship between a timing of acknowledgment feedback for the plurality of downlink semi-persistent scheduling transmissions and a timing of the resources for the plurality of downlink semi-persistent scheduling transmissions, wherein the indication of the relationship comprises a non-positive value; and
identify the first downlink control information communication as an error case based at least in part on the relationship comprising the non-positive value.

2. The UE of claim 1, wherein the one or more processor-readable instructions are further executable by the one or more processors to individually or collectively cause the UE to:
ignore the first downlink control information communication based at least in part on the error case identification.

3. The UE of claim 1, wherein the first semi-persistent scheduling configuration indicates that the indication of the relationship comprising the non-positive value is prohibited.

4. The UE of claim 3, wherein identifying the error case is based at least in part on the first semi-persistent scheduling configuration indicating that the relationship comprising the non-positive value is prohibited.

5. A user equipment (UE), comprising:
one or more processors;
one or more memories coupled with the one or more processors; and
one or more processor-readable instructions stored in the one or more memories and executable by the one or more processors individually or collectively to cause the UE to:
receive a first downlink control information communication that activates a first semi-persistent scheduling configuration, wherein the first semi-persistent scheduling configuration indicates resources for a plurality of downlink semi-persistent scheduling transmissions to the UE, and the first downlink control information communication comprises an indication of a relationship between a timing of acknowledgment feedback for the plurality of downlink semi-persistent scheduling transmissions and a timing of the resources for the plurality of downlink semi-persistent scheduling transmissions, wherein the indication of the relationship comprises a non-positive value;
receive a second downlink control information communication that indicates timing and resources for a first acknowledgment feedback for at least a first downlink semi-persistent scheduling transmission of the plurality of downlink semi-persistent scheduling transmissions; and
transmit the first acknowledgment feedback based at least in part on the second downlink control information communication.

6. The UE of claim 5, wherein, to receive the second downlink control information communication, the one or more processor-readable instructions are further executable by the one or more processors to individually or collectively cause the UE to:
detect a downlink control information communication after receiving the first downlink control information communication that includes an indication of uplink transmission resources for the first acknowledgment feedback.

7. The UE of claim 6, wherein the second downlink control information communication schedules a downlink shared channel transmission separate from the first semi-persistent scheduling configuration, schedules a retransmission of a previously transmitted semi-persistent scheduling configuration transmission, provides an activation update to the first semi-persistent scheduling configuration, activates a different semi-persistent scheduling configuration, or any combinations thereof.

8. The UE of claim 6, wherein the one or more processor-readable instructions are further executable by the one or more processors to individually or collectively cause the UE to:

identify the second downlink control information communication based at least in part on an associated cyclic redundancy check (CRC) that is scrambled by one or more of a cell radio network temporary identifier (C-RNTI) associated with the UE or a configured scheduling RNTI (CS-RNTI) associated with the UE.

9. The UE of claim 5, wherein a maximum number of feedback bits associated with one or more downlink semi-persistent scheduling transmissions of the plurality of downlink semi-persistent scheduling transmissions to be included in the first acknowledgment feedback corresponds to a number of hybrid acknowledgment repeat request (HARQ) processes configured in the first semi-persistent scheduling configuration.

10. The UE of claim 9, wherein the one or more processor-readable instructions are further executable by the one or more processors to individually or collectively cause the UE to:

determine that a number of semi-persistent scheduling transmissions that have acknowledgement feedback information to be reported in the first acknowledgment feedback exceeds the maximum number of feedback bits; and format the first acknowledgment feedback to include feedback information for a latest number of semi-persistent scheduling transmissions that can be reported using the maximum number of feedback bits.

11. The UE of claim 5, wherein the one or more processor-readable instructions are further executable by the one or more processors to individually or collectively cause the UE to:

receive an activation indication for at least a second semi-persistent scheduling configuration, and wherein a maximum number of feedback bits for each of the first semi-persistent scheduling configuration and the second semi-persistent scheduling configuration is provided as part of the respective first semi-persistent scheduling configuration and the second semi-persistent scheduling configuration.

12. The UE of claim 5, wherein the first acknowledgment feedback comprises two or more bits corresponding to two or more semi-persistent scheduling transmissions, and is appended to a dynamic feedback codebook associated with at least a first regular downlink transmission to the UE.

13. The UE of claim 5, wherein the one or more processor-readable instructions are further executable by the one or more processors to individually or collectively cause the UE to:

receive an activation for at least a second semi-persistent scheduling configuration; and determine that the second downlink control information communication indicates acknowledgment feedback timing and resources for one or more of the first semi-persistent scheduling configuration or the second semi-persistent scheduling configuration.

14. The UE of claim 13, wherein the second downlink control information communication includes an explicit indication of which of the first semi-persistent scheduling configuration, the second semi-persistent scheduling configuration, one or more other semi-persistent scheduling configurations, or combinations thereof, are to provide acknowledgment feedback using the indicated acknowledgement feedback timing and resources.

15. The UE of claim 13, wherein:

each semi-persistent scheduling configuration is associated with a component carrier of two or more component carriers, and which of one or more of the first semi-persistent scheduling configuration or the second semi-persistent scheduling configuration are to provide feedback information using the indicated acknowledgement feedback timing and resources is determined based at least in part on the component carrier used to communicate the second downlink control information communication.

16. The UE of claim 5, wherein the one or more processor-readable instructions are further executable by the one or more processors to individually or collectively cause the UE to:

determine that the first semi-persistent scheduling configuration and a second semi-persistent scheduling configuration are in a same physical uplink control channel (PUCCH) group; and wherein the second downlink control information communication indicate timing and resources for the first acknowledgment feedback that includes feedback information for downlink semi-persistent scheduling transmissions of the plurality of downlink semi-persistent scheduling transmissions corresponding to the first semi-persistent scheduling configuration and the second semi-persistent scheduling configuration based on the determining.

17. The UE of claim 5, wherein the one or more processor-readable instructions are further executable by the one or more processors to individually or collectively cause the UE to:

determine a latest semi-persistent scheduling transmission of the plurality of downlink semi-persistent scheduling transmissions for which acknowledgment feedback is to be provided in the first acknowledgment feedback based at least in part on the second downlink control information communication.

18. The UE of claim 17, wherein, to determine, the one or more processor-readable instructions are further executable by the one or more processors to individually or collectively cause the UE to:

determine a last semi-persistent scheduling transmission of the plurality of downlink semi-persistent scheduling transmissions that has been received at the UE prior to a UE processing timeline for reporting acknowledgment feedback.

19. The UE of claim 17, wherein, to determine, the one or more processor-readable instructions are further executable by the one or more processors to individually or collectively cause the UE to:

determine a last semi-persistent scheduling transmission of the plurality of downlink semi-persistent scheduling transmissions that has been received at the UE prior to receiving the second downlink control information communication.

20. The UE of claim 17, wherein, to determine, the one or more processor-readable instructions are further executable by the one or more processors to individually or collectively cause the UE to:

determine a last semi-persistent scheduling transmission of the plurality of downlink semi-persistent scheduling transmissions that has been received at the UE at the latest semi-persistent scheduling transmission prior to a downlink shared channel transmission that is scheduled by the second downlink control information communication.

21. The UE of claim 17, wherein:

the latest semi-persistent scheduling transmission is determined per semi-persistent scheduling configuration when multiple semi-persistent scheduling configurations are active or is determined across multiple active semi-persistent scheduling configurations.

22. The UE of claim 5, wherein an order of feedback bits of the acknowledgment feedback is determined based at least in part on a predetermined rule set.

23. The UE of claim 22, wherein:

the order of feedback bits of the acknowledgment feedback corresponds to an order in which each corresponding semi-persistent scheduling transmission is received at the UE; and the order of feedback bits of the acknowledgment feedback corresponds to an order of hybrid acknowledgment repeat request (HARQ) process IDs associated with each semi-persistent scheduling transmission for which acknowledgment feedback is provided.

24. The UE of claim 5, wherein:

the second downlink control information communication does not schedule an associated downlink or uplink transmission; and the second downlink control information communication includes one or more fields that indicate the timing and resources for the acknowledgment feedback, and one or more fields that indicate a downlink or uplink data transmission is not scheduled by the second downlink control information communication.

25. The UE of claim 5, wherein:

the first acknowledgment feedback includes a first number of feedback bits that correspond to a configured number of hybrid acknowledgment repeat request (HARQ) processes indicated in the first semi-persistent scheduling configuration; and the first acknowledgment feedback includes feedback information for a second number of semi-persistent scheduling transmissions that is fewer than the first number of feedback bits, and the UE reports a negative acknowledgment or a previous value for each feedback bit of the first number of feedback bits that does not have an associated semi-persistent scheduling transmission in the second number of semi-persistent scheduling transmissions.

26. A method for wireless communications by a user equipment (UE), comprising:

receiving a first semi-persistent scheduling configuration that indicates resources for a plurality of downlink semi-persistent scheduling transmissions to the UE;

receiving a first downlink control information communication associated with the first semi-persistent scheduling configuration, wherein the first downlink control information communication comprises an indication of a relationship between a timing of acknowledgment feedback for the plurality of downlink semi-persistent scheduling transmissions and a timing of the resources for the plurality of downlink semi-persistent scheduling transmissions, wherein the indication of the relationship comprises a non-positive value; and identifying the first downlink control information communication as an error case based at least in part on the relationship comprising the non-positive value.

27. The method of claim 26, further comprising:

ignoring the first downlink control information communication based at least in part on the error case identification.

28. The method of claim 26, wherein the first semi-persistent scheduling configuration indicates that the indication of the relationship comprising the non-positive value is prohibited.

29. A method for wireless communications at a user equipment (UE), comprising:

receiving a first downlink control information communication that activates a first semi-persistent scheduling configuration, wherein the first semi-persistent scheduling configuration indicates resources for a plurality of downlink semi-persistent scheduling transmissions to the UE, and the first downlink control information communication comprises an indication of a relationship between a timing of acknowledgment feedback for the plurality of downlink semi-persistent scheduling transmissions and a timing of the resources for the plurality of downlink semi-persistent scheduling transmissions, wherein the indication of the relationship comprises a non-positive value;

receiving a second downlink control information communication that indicates timing and resources for a first acknowledgment feedback for at least a first downlink semi-persistent scheduling transmission of the plurality of downlink semi-persistent scheduling transmissions; and transmitting the first acknowledgment feedback based at least in part on the second downlink control information communication.

30. The method of claim 29, wherein the receiving the second downlink control information communication comprises:

detecting a downlink control information communication after receiving the first downlink control information communication that includes an indication of uplink transmission resources for the first acknowledgment feedback.

* * * * *